United States Patent [19]

Newell

[11] 4,172,569

[45] Oct. 30, 1979

[54] TAPE TRANSPORT SYSTEM WITH PERIPHERAL BELT DRIVE

[75] Inventor: Chester W. Newell, San Jose, Calif.

[73] Assignee: Newell Research Corporation, Saratoga, Calif.

[21] Appl. No.: 824,166

[22] Filed: Aug. 12, 1977

Related U.S. Application Data

[63] Continuation of Ser. No. 758,781, Jan. 12, 1977, abandoned.

[51] Int. Cl.² .............................................. G03B 1/04
[52] U.S. Cl. ................................................ 242/192
[58] Field of Search ............... 242/192, 196, 200, 210, 242/67.5; 360/96, 132; 226/188, 190, 195

[56] References Cited

U.S. PATENT DOCUMENTS

| | | | |
|---|---|---|---|
| 2,743,878 | 5/1956 | Masterson | 242/192 |
| 3,125,311 | 3/1964 | Willis | 242/192 |
| 3,514,049 | 5/1970 | Decker et al. | 242/192 |
| 3,692,255 | 9/1972 | Von Behren | 242/192 |
| 3,907,230 | 9/1975 | Merle et al. | 242/192 |
| 3,942,743 | 3/1976 | Jinsenji | 242/192 |
| 3,974,982 | 8/1976 | Stone | 242/192 |

FOREIGN PATENT DOCUMENTS

| | | | |
|---|---|---|---|
| 1089988 | 9/1960 | Fed. Rep. of Germany | 242/192 |
| 698262 | 1/1931 | France | 242/192 |
| 860272 | 2/1961 | United Kingdom | 242/192 |

*Primary Examiner*—Leonard D. Christian
*Attorney, Agent, or Firm*—Allan R. Fowler

[57] ABSTRACT

Disclosed is a peripheral belt drive tape transport system wherein an endless loop drive belt, which is relatively stiff compared to the tape, peripherally drives tape wound supply and take-up hubs to transfer tape from one to the other and maintain a tension in the tape. The drive belt is supported by non-compliant guide means including a plurality of belt guide members, and has first and second portions extending in curved paths between the peripheries of said guide members while intermediately engaging the peripheries of the tape wound on the supply and take-up hubs respectively. The guide members have corresponding portions at first and second levels, the corresponding diameters of which afford different mechanical advantages. The drive belt engages the guide members at the first level. An endless tensioning belt engages the guide members at the second level for establishing a differential in tension between the first and second portions of the drive belt so as to produce a tension in the tape. Significantly, means are included for substantially reducing the net tension variation in the respective drive portions resulting from change in their curved paths due to tape transfer between the hubs. The latter includes means mounting the hubs and guide members on spaced fixed axis locations for producing approximately equal and opposite path length change effects for the first and second portions of the drive belt as the tape transfers between the hub.

16 Claims, 16 Drawing Figures

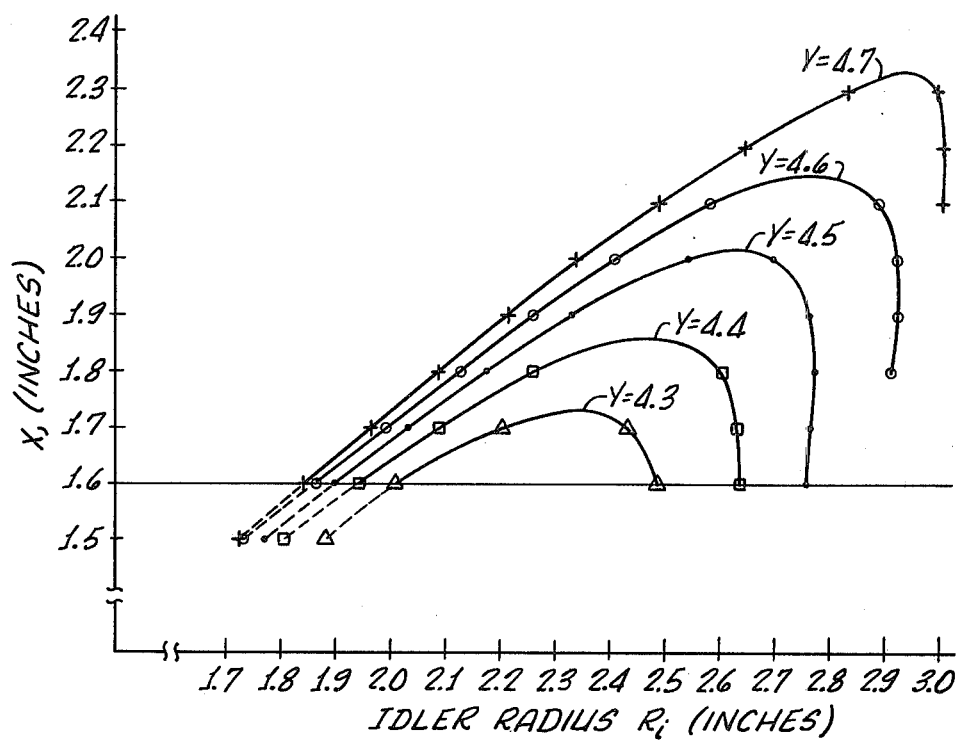
FIG. 15.
FIG. 16.
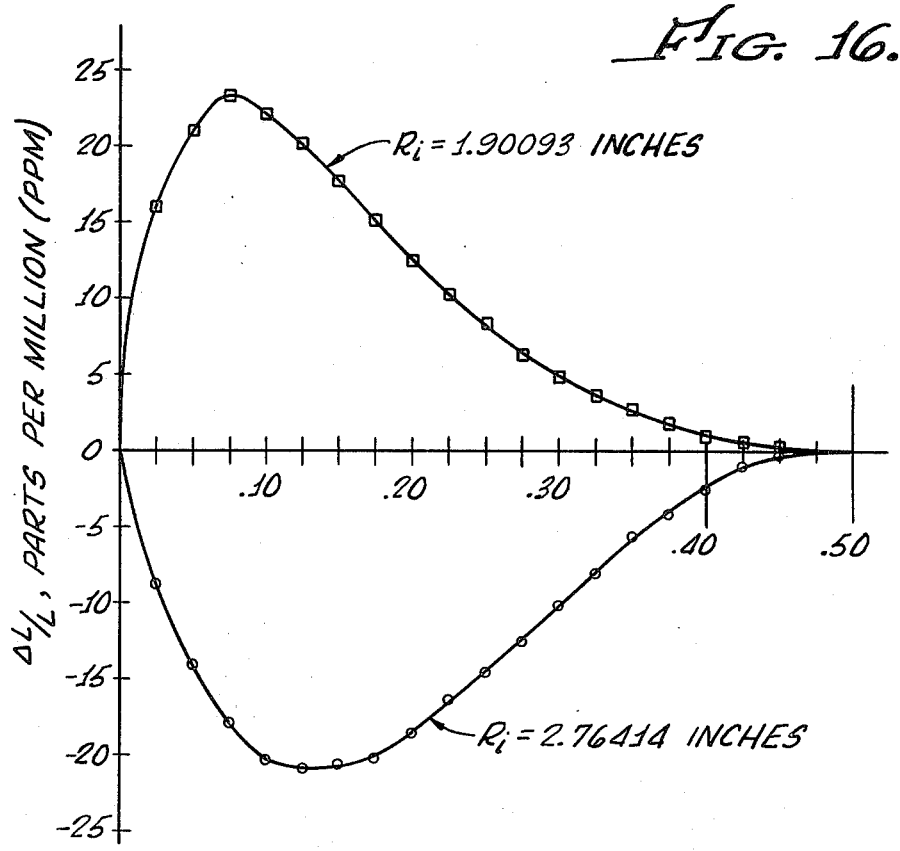

TAPE TRANSPORT SYSTEM WITH PERIPHERAL BELT DRIVE

This is a continuation of application Ser. No. 758,781, filed Jan. 12, 1977 and now abandoned.

This invention relates to tape transport systems, and has particular reference to tape transport systems which incorporate a peripheral belt drive loop which engages the peripheries of tape wound supply and take-up hubs, in driving relationship therewith, to transfer tape from one to the other while maintaining a tension in the tape.

Peripheral belt drive tape transports are typified, for example, in U.S. Pat. Nos. 3,692,255 to Von Behren, 3,305,186 to Burdorf et al, and 2,658,398 to Masterson.

Inherent in the prior art peripheral belt drive tape transports is that the drive belt is either elastic enough to accommodate the changing belt path length as the tape wound supply and take-up hub diameters change with tape transfer therebetween, or the drive belt loop employs compliance elements such as compliant belt guide members or compliant tape hub mounts to accommodate this change. Systems employing relatively elastic drive belts and systems employing relatively stiff drive belts but utilizing one or more compliance elements in support of the drive belt both incur substantial limitations.

In systems employing relatively elastic drive belts, a prescribed degree of elasticity is usually relied upon, which is difficult to maintain under changing environmental conditions of temperature, etc. Moreover, the tape being transported is frequently a relatively stiff material, such as Mylar magnetic recording tape, and using a relatively elastic drive belt means that the bulk of the stress or tension and stress or tension variations in the mechanical coupling between the two tape wound hubs occurs in the tape itself, including tension variations introduced by use of the elastic drive belt. This causes undesirable stretch and perturbations in the tape and adversely affects the time base stability of the tape transport system. Further, it limits the accelerations that may be applied to the tape by the system to effect fast start, stop and rewind conditions, as required for example to minimize inter-record gaps between successive recordings on the tape. As is well known in the tape recording art, there are a myriad of additional problems, and some partial solutions therefor which incur yet further difficulties.

Of course, if the drive belt is relatively stiff compared to the tape, ostensibly it will carry most of the stress or tension and stress or tension variations, and the system will have a much higher resonant frequency and thus much faster velocity resetting time after system acceleration, with both of these factors, and others having attendant advantages. The requirement for inclusion of one or more compliance elements in the support path for the relatively stiff belt in order to accommodate the changing belt path length due to tape transfer defeats significantly the stiffness of the belt and the ostensible advantages therefrom. Moreover, dependable compliance structures are expensive, they take up valuable space which is especially limited in cassette or cartridge enclosures they are susceptable to external g factors, and for good operation they require either excessive compliance forces as damping, a further complication.

I have discovered a substantial solution to many of the problems and limitaions inherent in the above described peripheral belt drive tape transport systems. In the broad sense, my discovery resides in the fact that I can combine a relatively stiff drive belt, supported by non-compliant means including the tape wound supply and take-up hubs, with a fixed geometric placement of the basic elements of the tape transport system which produces a substantial, if not almost total self-compensation in the drive belt path length change effects occuring by virtue of the changing diameters of the tape wound hubs as the tape is transferred from one to the other.

In regard to the above mentioned geometric placement aspect, it is to be noted that this geometric placement is interrelated with choices to be made in other variables such as tape hub diameters, diameters of drive belt guide members, and the amount of change in the tape wound hub diameters as tape is fully transferred from one hub to the other, the latter depending upon the thickness and length of the tape to be transferred.

Also, it should be recognized that minute errors in geometric placement, typically a few one thousandths of an inch in the wrong direction, can cause a very substantial upset in what otherwise could be a substantially self-compensating system, for example, when using a drive belt having a stiffness greater than that of a 0.001 inch (backing) thick, 0.25 inches wide Mylar magnetic recording tape within a typical cassette or cartridge enclosure.

In accordance with my invention, I provide an endless drive belt loop having a stiffness which is at least approximately equal to, or greater than, that of the tape for peripherally driving the tape wound hubs to transfer tape from one to the other, (in order that the drive belt, rather than the tape, will absorb most of the acceleration energy), and non-compliant guide means for supporting the drive belt in driving relationship with the tape wound hubs. The non-compliant guide means includes a plurality of belt guide members, and the drive belt engages the peripheries of the belt guide members and extends proximate to the tape hubs. In this regard, the drive belt loop has a first portion extending in a curved path between the peripheries of a pair of the guide members and intermediately engaging the periphery of the tape wound on the supply hub, and also has a second portion extending in a curved path between peripheries of a pair of the guide members and intermediately engaging the periphery of the tape wound on the take-up hub. Means are included for establishing a differential in tension between the first and second portions of the drive belt to produce a tension in the tape. In combination with the above is a means for substantially reducing the net tension variation in the first and second drive belt portions resulting from change in the curved paths due to tape transfer between the hubs. The latter comprises means mounting the hubs and guide members at spaced, fixed locations for producing approximately equal and opposite path length change effects for the first and second portions of the drive belt as the tape length transfers between the hubs.

In an exemplary embodiment of my invention, the drive belt has a width approximately equal to the width of the tape, thus permitting use of a thinner thin drive belt while maintaining the cross-sectional area thereof required for stiffness, and also achieving the advantages of larger area engagement with the tape and longer belt life, all of which is not readily accomplished with relatively thick elastic belts which if engaged with the tape wound hubs near an edge of the tape tend to curl over the edge and guide off of the tape. The stiffness of the drive belt is typically more than double the comparable stiffness of the tape, whereby stress loading on the tape extending between the hubs is ideally reduced to a minor proportion of that carried by the belt and high accelerations of the tape transfer system are permitted. Also, the tension variation in the drive belt portions, is related to the ratio of the absolute value of the net change in belt path length, $|\Delta L|$, to the belt length, L.

Also, in an exemplary embodiment of my invention, the tensioning means comprises an endless tensioning belt engaging the periphery of at least one of the belt guide members at a second level thereon. Preferably the non-compliant guide means for supporting the drive belt in driving relationship with the tape wound hubs includes at least two rotary guide members each having corresponding portions at first and second levels with the corresponding diameters of the guide members at the first and second levels affording different mechanical advantages, with the drive belt engaging the peripheries of the two guide members at the first level and the tensioning belt engaging the peripheries of the two guide members at the second level. The tensioning belt, when used in conjunction with a stiff drive belt, permits high tape speeds and accelerations which could not otherwise be properly accommodated by a brake mechanism suitable for inclusion in a limited enclosure, such as a conventional cassette or cartridge.

The tape transport system of my invention has many different applications, for example in motion picture cameras, microfilm reeling systems, audio tape recorders, video tape recorders, log tape recorders and electronic data processing tape recorders. The tape, of course, can be any medium in tape form, for example, magnetic recording tape or photographic film. The tape transport system is readily adaptable for containment in a conventional cassette or cartridge enclosure, where one or more of the rotary belt guide members is readily exposed for being driven by an external capstan or the like. The system of my invention is especially useful in those applications which must withstand external shock loads and environmental extremes, in applications where a very thin or delicate tape medium is employed or where the tape is subject to high accelerations, decelerations and high running speed, and in applications where precise incremental tape movement is required or where time base stability is a critical factor.

The above and other features and advantages of my invention will be apparent from the following explanation and detailed description of embodiments thereof, taken in conjunction with the accompanying drawings, in which:

FIG. 15 is a graph showing the family of relationship of the rectilinear x, y coordinates of the hubs and idlers (belt guide members) and idler radii which result in minimum $|\Delta L|/L$'S; and, FIG. 16 is a graph showing the effect of idler the selection of each of the two (belt guide member) radii which give particular transports for minimum $|\Delta L|/L$, from the family of FIG. 15.

Figure 1:
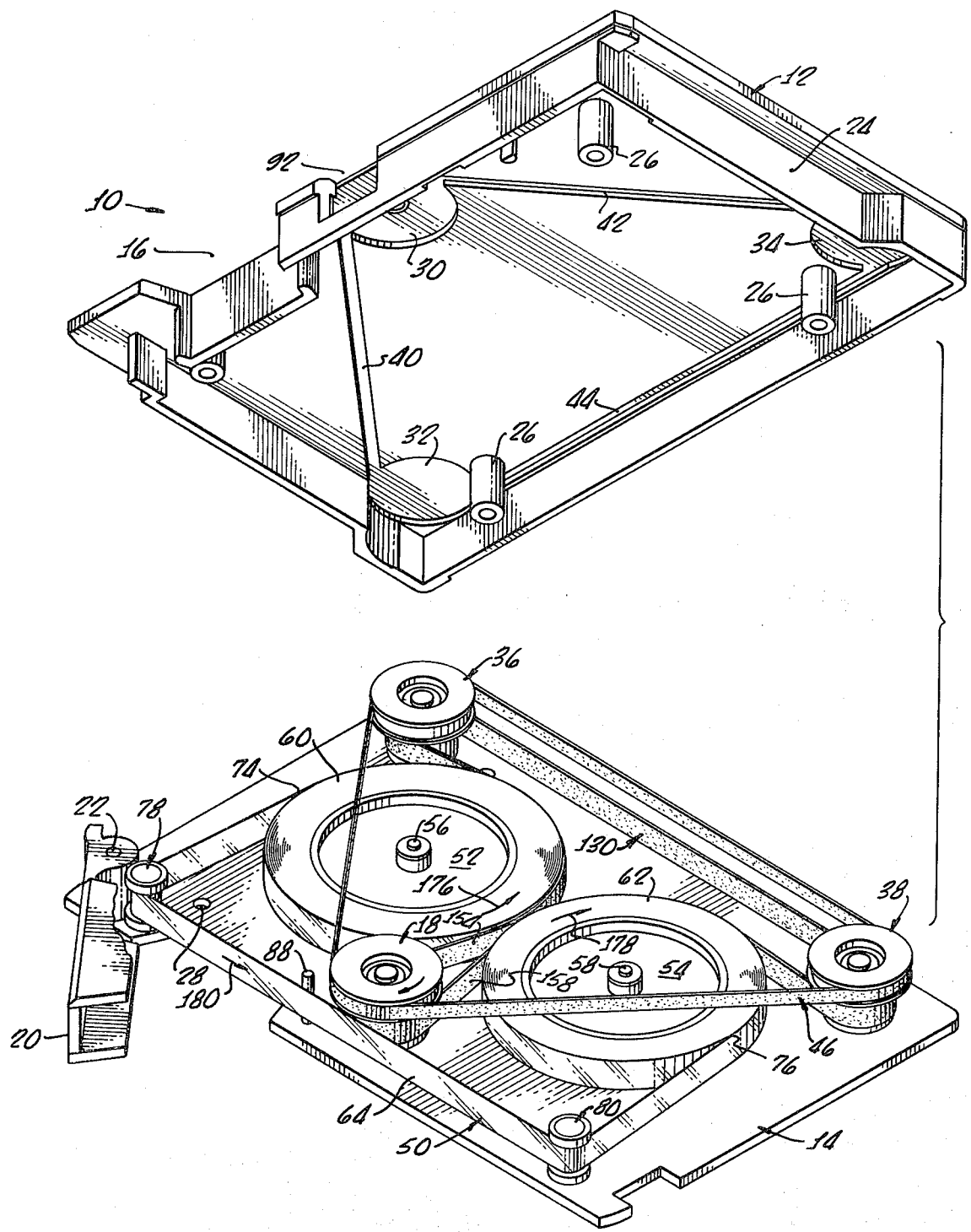
FIG. 1 is a perspective view of one embodiment of the tape transport system of my invention housed in a cartridge configuration, with the top half of the cartridge being removed and shown in exploded perspective.
Figure 2:
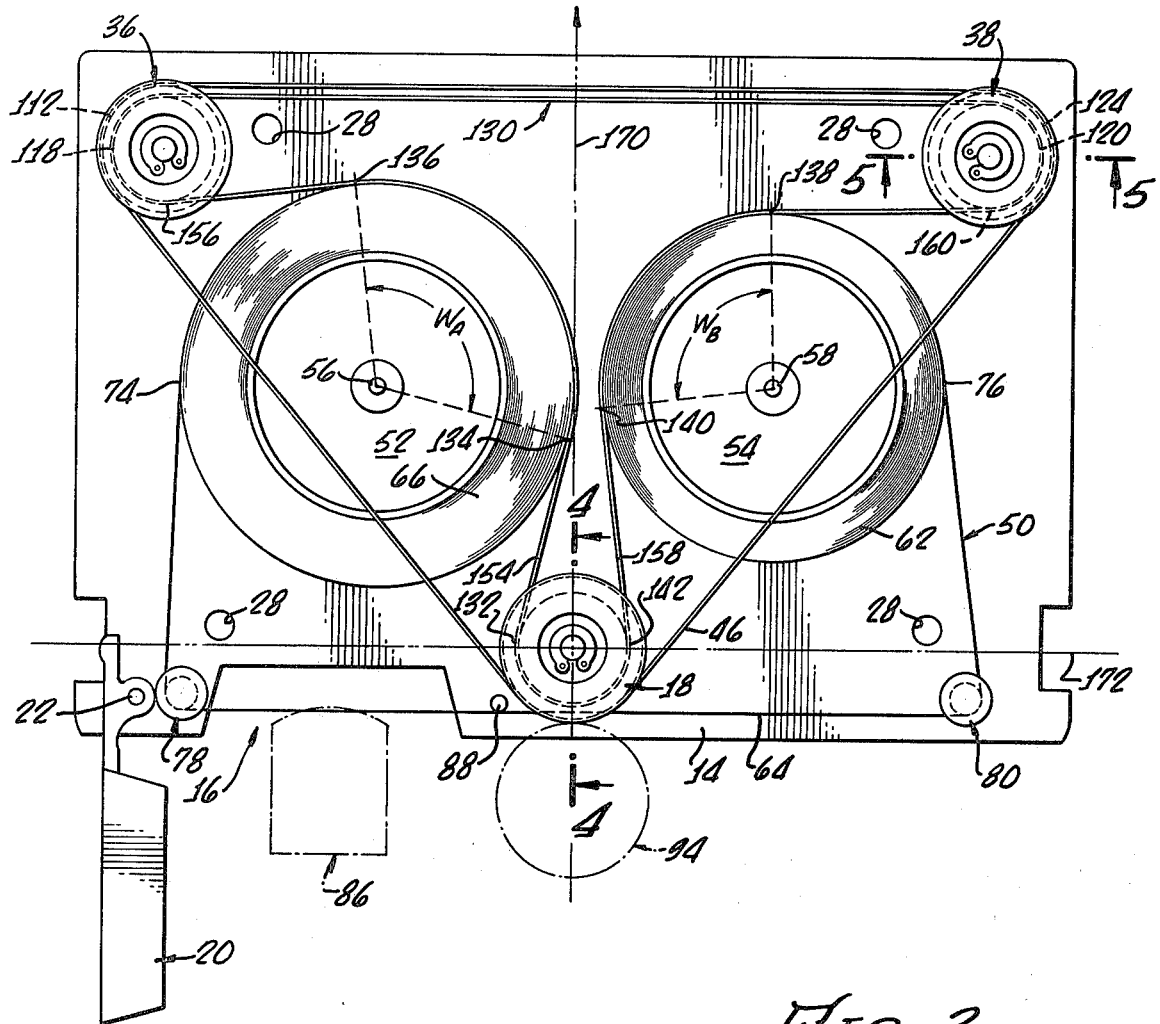
FIG. 2 is a top plan view of the bottom half of the cartridge of FIG. 1.

Referring now to the drawings, FIGS. 1 and 2 show a first embodiment of my invention in a cartridge configuration especially suited for electronic data processing applications.

A cartridge 10 includes a plastic molded case upper portion 12 and a lower metal plate 14. Dimensionallly the cartridge conforms to ANSI (American National Standard Institute) proposed standard number X3B5/7518. This proposed standard dictates the general overall dimensions of the cartridge, including the position and size of a head aperture or port 16, the position of a rotary drive and belt guide member 18, and the size, shape and position of a tape guard 20, which is mounted for rotation about a pin 22 fixed to plate 14, in order to render the cartridge compatible with existing commercially available equipment such as model number 5100 portable computer manufactured by International Business Machines (IBM).

The molded plastic upper case portion 12 has side portions 24 configured to mate with the lower plate 14 when attached thereto and is provided with a set of similar legs, 26, for mounting the upper case portion 12 to the plate 14 by means of screws, not shown, through a set of plate holes, 28. Circular recessed areas, 30, 32 and 34 are provided in the inside of the upper case portion 12 to allow free rotation of the drive member 18 and a pair of rotary tape guide members or idlers 36, 38. Similarly, a set of recessed slots, 40, 42, 44 in the inside of the upper case portion 12 and extending between the recessed areas 30, 32 and 34 allow for free movement of a tensioning belt 46 trained about the rotary drive member 18 and rotary belt guide members 36, 38.

First and second hubs 52, 54 act as tape supply and take-up hubs and are rotatably mounted with parallel axes of rotation and in a generally coplanar relationship on the lower plate 14 by means of a pair of axial shafts 56, 58. An approximately 286 foot length of nominally 0.001 inch backing thickness and 0.25 inch wide. Mylar magnetic recording tape 50 is distributed within the cartridge 10, having one end portion or pack 60 wound on the first hub 52, an opposite end portion or pack 62 wound on the second hub 54, and an intermediate portion 64 extending between the hubs from a peripheral point 74 on tape pack 60 to a peripheral point 76 on tape pack 62. In operation the tape 50 passes between the packs 60, 62 in a path parallel to the lower plate 14.

The intermediate portion of the tape 64 is trained over a pair of similar tape guides 78, 80 which are non-rotatably fixed to the lower plate 14. The tape guides 78, 80 provide proper alignment of the tape 50 with the aperture 16, as per ANSI proposed standard number X3B5/7518 in order to maintain a proper operational relationship with a magnetic recording head 86 shown in phantom lines in FIG. 2 when the cartridge 10 is in operative placement with record/playback apparatus, not shown. A tape support pin 88 fixed to the lower plate 14 prevents the tape 50 from touching the drive member (belt guide) 18 while the head 86 is in operational contact with recording tape 50.

The drive member 18 is rotatably mounted on a shaft 90 (FIG. 4) to the lower plate 14 at a centered frontal position on the cartridge 10 as per ANSI proposed standard number X3B5/7518 so as to protrude through a window 92 in the upper case portion 12 for engagement with a drive capstan 94, shown in phantom line in FIG. 2, when the cartridge 10 is in operative placement in a record/playback apparatus, not shown.

Figure 4:
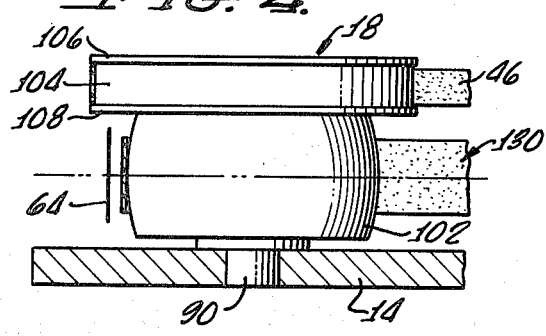
FIG. 4 is a fragmentary view, partially in section taken along line 4—4 of FIG. 2.
Figure 5:
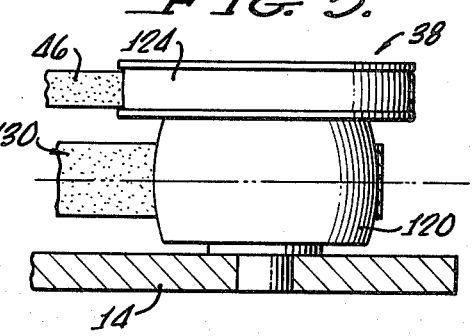
FIG. 5 is a fragmentary view, partially in section taken along line 5—5 of FIG. 2.

As more clearly shown in FIG. 4, the drive member 18 has a first level 102 which in this embodiment has a diameter of 0.682 inches and a second level 104 of diameter 0.870 inches which offer different mechanical advantages. The second level 104 extends between a pair of rims 106, 108 of larger diameter (0.883 inches). The larger diameter rims 106, 108 allow engagement with the drive capstan 94 without interference with the tensioning belt 46 trained about the second level 104. The diameter of the driven rims 106, 108 results in a ratio of driven rim peripheral velocity to resultant tape velocity of 1.196 as per the proposed ANSI standard cited above.

The pair of similar rotary belt guide members, or idlers, 36, 38 are rotatably mounted on a pair of parallel shafts 114, 116 fixed to the lower plate 14. As best shown in FIG. 4, illustrating idler 38, each idler 36, 38 is of a stepped construction having first levels 118, 120, respectively, with diameters of 0.605 inches and second levels 122, 124, respectively, with diameters of 0.770 inches for affording different mechanical advantage. The idlers 36, 38 and drive member 18 are all disposed on axes parallel to the axes of the hubs 52, 54 and are aligned in a vertical sense from the plate 14 such that the center of each of the first levels 102, 118, 120 are corresponding in that they lie equally distant from the plate 14 and the centers of each of the second levels 104, 122 and 124 correspondingly lie an equal but greater distance from the plate 14.

An endless loop drive belt 130 having a fixed insitu length (L) of 17.235 inches, is trained about the first levels 102, 118, 120 of the drive member 18 and the idlers 36, 38.

When the drive member 18 is rotated by the capstan 94 in a clockwise direction, the drive belt 130 departs the first level 102 at a peripheral point 132 and then engages the tape pack 60 from a peripheral point 134 to a point 136 so as to define a wrap angle $W_A$, about the tape pack 60. Continuing, the endless drive belt 130 is trained about the pulley 36 on the first level 118 thereof and the pulley 38 on the first level 120 thereof before engaging the other tape pack 62 at a point 138.

The belt 130 engages the tape pack 62 from the point 138 to a point 140 so as to define a wrap angle $W_B$. Continuing, the drive belt 130 closes upon the drive member 18 at a point 142 on the first level 102 thereof.

As shown in FIGS. 1 and 2 the drive belt 130 has a first portion 154, extending between the belt drive member 18 from the peripheral point 132 thereon to the belt guide or idler 36 at a peripheral point 156 thereon which engages the tape pack 60 wound on the first hub 52, and a second portion 158, extending between a peripheral point 142 on the drive member 18 to a peripheral point 160 on the idler 38, which engages the tape pack 62 wound on the record hub 54.

The precise calculated positions of the tape hubs 52, 54 with respect to the rotary driving member 18 and idlers 36, 38 is critical and provides means enabling the use of a fixed length Mylar drive belt 130 having a thickness of 0.003 inches and a width of 0.200 inches, which means that the belt is stiffer than the Mylar recording tape 50.

Although both the tape 50 and the drive belt 130 are Mylar having the same Young's Modulus of elasticity (E), the belt 130 is stiffer because it has greater cross-sectional area (A). The coefficient of elongation describes the ability of a belt to stretch and is equal to 1/AE. Hence, since the cross-sectional area of the drive belt 130 is larger than that of the tape 50, its coefficient of elongation is smaller which means the belt 130 is stiffer than the tape 50 for comparable span lengths (typical stiffness ratios from 2 to 1 for Mylar to over 100 to 1 for steel and fiberglass have been found in practice).

Figure 3:
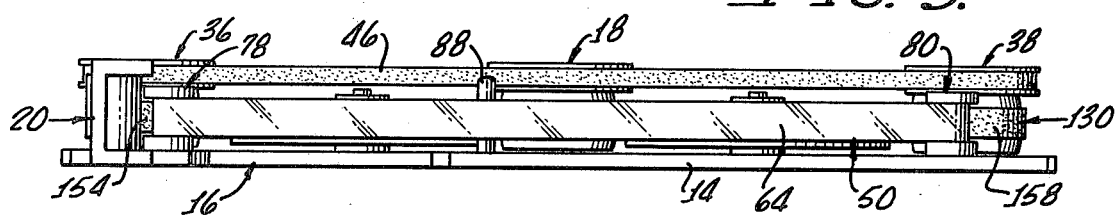
FIG. 3 is a front elevation of the bottom cartridge half shown in FIG. 2.

As shown in FIGS. 1, 2 and 3, the location of the center of the hubs 52, 54 and idlers 36, 38 may be symetric about vertical reference line 170 running through the center of the rotary tape drive member 18. The idler centers are each 2.477 inches from the reference line 170 and the hub 52, 54 centers are each 1.187 inches from the reference line 170. The centers of the tape guides 78, 80 are 2.370 inches from the reference line 170. The placement of the centers of the members from a horizontal reference line 172 running through the center of the drive member 18 are 2.910 inches for the idlers 36, 38, 1.540 inches for the hubs 52, 54 and 0.280 inches for the tape guides 78, 80. The radius of each of the hubs is 1.420 inches. The wrap angles $W_A$, $W_B$ vary from a minimum of 76.4° for an empty hub to 137.4° for a full pack. Continuing, the endless tensioning belt 46, with an insitu length of 15.110 inches provides means for causing tension in the center portion of the tape 64 and is of sufficient stiffness to cause a differential in tension of approximately 6 ounces between the first portion 154 of the drive belt 130, and the second portion 158 of the drive belt 130. This results in approximately two ounces of tension in the tape 50.

Although it may be impossible to position the drive member 18 and idlers 36, 38 in order that the drive belt having no incremental absolute value in length $|\Delta L|$ as the tape is transferred between the first and second hubs 52, 54, this embodiment, for example, maintains a $|\Delta L|$ of less than 0.001 inch for the drive belt having a length (L) of 17.235 inches, or a ratio of $|\Delta L|/L$ of less than 0.000,060 or 60 parts per million (PPM). Other designs using stiffer belts with resultant $|\Delta L|/L$ as low as PPM have also been employed within the ANSI cartridge configuration.

The tensioning belt 46 is trained in a spaced apart relationship with the drive belt 130 about the rotary drive member 18 and the pulleys 36, 38. As shown in FIGS. 1, 2, and 3, the tensioning belt 46 is trained about the second level 104 of drive member 18 and about the second levels 122, 124 of the idlers 36 and 38 so that the length of the tensioning belt lies in a plane parallel to the plate 14.

It should be appreciated that in operation, the tensioning belt 46 provides a near lossless means for maintaining proper tension in the drive belt 130, hence in the tape 50. In other words little energy is dissipated in the tensioning of the drive belt portions 154, 158 and the tape portion 64.

Thus, since virtually no energy dissipative elements are employed a an extremely stiff drive belt 130 can be effectively utilized. The stiffer the belt 130 the more stress it will carry relative to the tape portion 64 passing the head 86. Hence, thinner tapes 50 can be employed because the need for the tape to transmit energy has been reduced. Consequently, a greater length of tape can be housed in the exemplary cartridge embodiment than in prior art cartridges made to the ANSI proposed specification X3B5/7518. In this instance, Mylar magnetic tape having a backing thickness of 6 microns could be used which would allow a 1000 foot length to be wound about the hubs 52, 54 without altering the cartridge size or departing from ANSI proposed standard number X3B5/7518.

An additional feature of a stiff belt 130 is that it allows the use of a wider belt than possible with a belt less stiff than the tape. As best shown in FIGS. 3 and 4, the drive belt 130, as shown by belt portion 158, is nearly as wide as the tape 50, as shown by tape portion 64, although it may be as wide as the tape 50.

A wide stiff belt 130 can be utilized because, being stiffer than the tape 50, it does not curl over the edge of the tape packs 60, 62 if it becomes slightly misaligned and engages the pack 60, 62 at or near an outside edge thereon. A belt more elastic than the tape will tend to curl over the edge of the tape because it deforms easier than the tape and such curling can lead to disengagement of the belt from the tape pack.

Returning to the operation of the cartridge 10, it is evident that clockwise rotation of the drive member 18 by the capstan 94 will move the drive belt which engages the drive member 18, tape packs 60, 62 and idlers 36, 38 in non-slip relationship. The drive belt in turn drives the tape packs and idlers in the directions indicated by the arrows 176, 178. Typically, the drive belt has a pretension of about 72 ounces, the tensioning belt has a pretension of about 11 ounces, and upon driving the system the tensioning belt, due to its different mechanical advantage with the drive member and the idlers, creates a differential in tension between the opposite portions of the drive belt engaging the respective peripheries of the tape packs of about 6 ounches, thus creating and maintaining about 2 15 ounces tension in the tape portion 64 extending between the packs.

Figure 6:
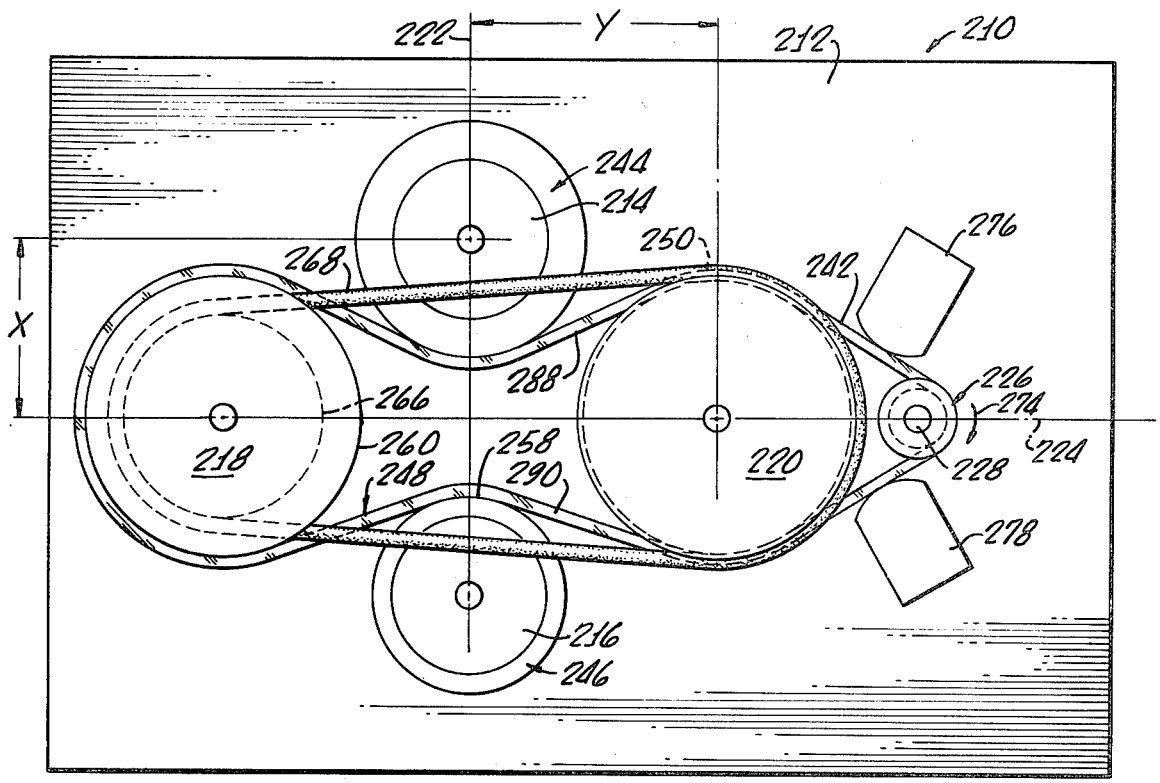
FIG. 6 is a top plan view of a second embodiment of the tape transport system of my invention (with belt and pully dimensions exaggerated for ease of understanding)
Figure 7:
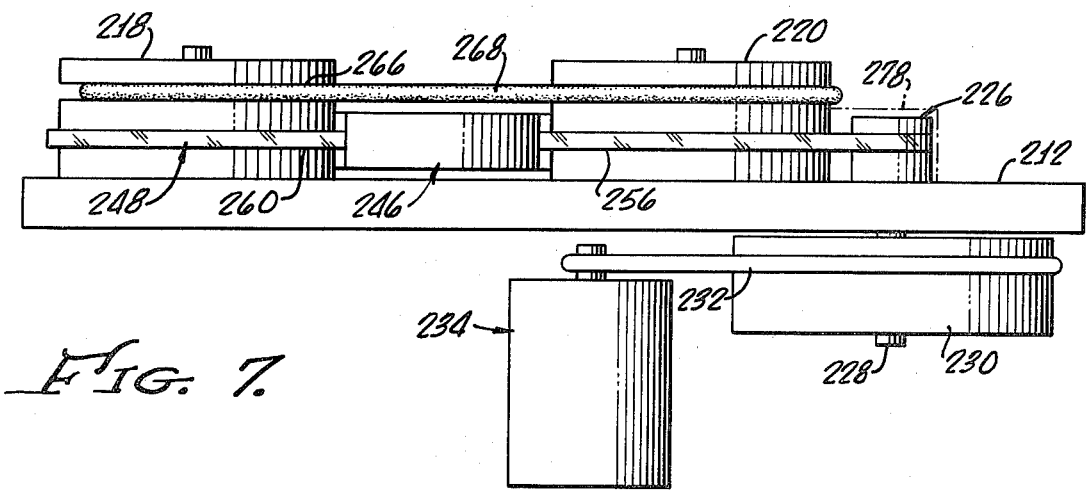
FIG. 7 is a side elevation of the apparatus shown in FIG. 6.

Referring now to FIGS. 6 and 7, a second embodiment of the tape transport system of my invention is included in a tape recorder 210. The recorder 210 has a frame 212 upon which are mounted for rotation a pair of tape hubs 214, 216 and a pair of belt guides or idlers 218, 220, all having parallel axes of rotation.

The layout of the hubs 214, 216 and idlers 218, 220 is symetric with the centers of the hubs 214, 216 lying on a vertical reference line 222 and each being spaced a distance X from a horizontal reference line 224 passing through the centers of the idlers 218, 220. The centers of the idlers 218, 220 are each spaced a distance Y from the vertical reference line 222.

A rotary belt drive member 226 is mounted in line with the horizontal reference line 224 on an axial shaft 228 which is journaled in the frame 212. The axial shaft 228 extends through the frame 212 where it is axially fixed to a flywheel 230. The belt drive member 226 is rotated by the shaft 228 as the flywheel 230 is rotated by a belt 232, trained thereabout and driven by a motor 234.

A tape 242 is wound about the hub 214 to form a pack 244 and also wound about the hub 216 to form a second tape pack 246. A drive belt 248 is trained about the drive member 226 over the idler 220 at a first level 256 thereof, over a peripheral portion 258 of the tape pack 246 and around a first level 260 of the idler 218, then over a peripheral portion 262 of the tape pack 244 and over the first level 256 of the idler 220 and finally closing on the drive roller 226.

A tensioning belt 268 is trained about the second or upper level 264 of the idler 220 and about a second level 266 of the idler 218. The idler 218 has a smaller diameter at its second level, and the drive belt 248 and tensioning belt 268 engage between the peripheries of the two idlers in non-slip relationship and with different mechanical advantages.

When the drive member 226 is rotated in a clockwise direction as shown by arrow 274, the tape 242 is transported from the tape pack 214 on the exterior of the drive belt, around the first level 256 of the idler 220 past a magnetic head 276 over the drive member 226, past a second head 278, over the first level 256 of the idler 220 and finally onto the tape pack 246. In this transfer of tape 242 the tape pack 244 and hub 214 revolve in a counterclockwise direction and the tape pack 246 and hub 216 revolve in a clockwise direction.

Again the function of the tensioning belt is to create a tension in the tape as it passes from the tape pack 244 to the tape pack 246, by creating and maintaining a differential in tension between a first belt portion 288 of the drive belt extending between the peripheries of idlers 218, 220 and engaging tape pack 244 and a second portion 290 extending between the peripheries of idlers 218, 220 and engaging the periphery of tape pack 246.

This embodiment of my invention illustrated in FIGS. 6 and 7 has a configuration in which a very stiff belt may be employed. For example, the drive belt material may be fiberglass having a Young's Modulus of elasticity of $2 \times 10^8$ pis, as compared to Mylar which has a Young's Modulus of elasticity of $7.5 \times 10^5$ psi. Additionally, the drive belt supports the tape as it passes over the magnetic heads 276, 278 in order to insure positive head contact and allow high speed tape transport.

Using 1.0000 inch diameter hubs 214, 216 with a maximum tape pack 244, 246 diameter of 2.000 inches, 2.7746 inch radius idlers 218, 220, a Y dimension of 4.5000 inches, and an X dimension of 1.7000 inches, a $|\Delta L|/L$ ratio of less than 0.000,003 can be achieved with this embodiment. FIGS. 8 through 16 are generally concerned with the underlying theory enabling the various geometrical selections and other trade-off's to be made in order to provide different degrees of self-compensation for tension variation in the drive belt as the tape pack diameters change during transport of the tape from one hub to the other.

Figures 8, 9:
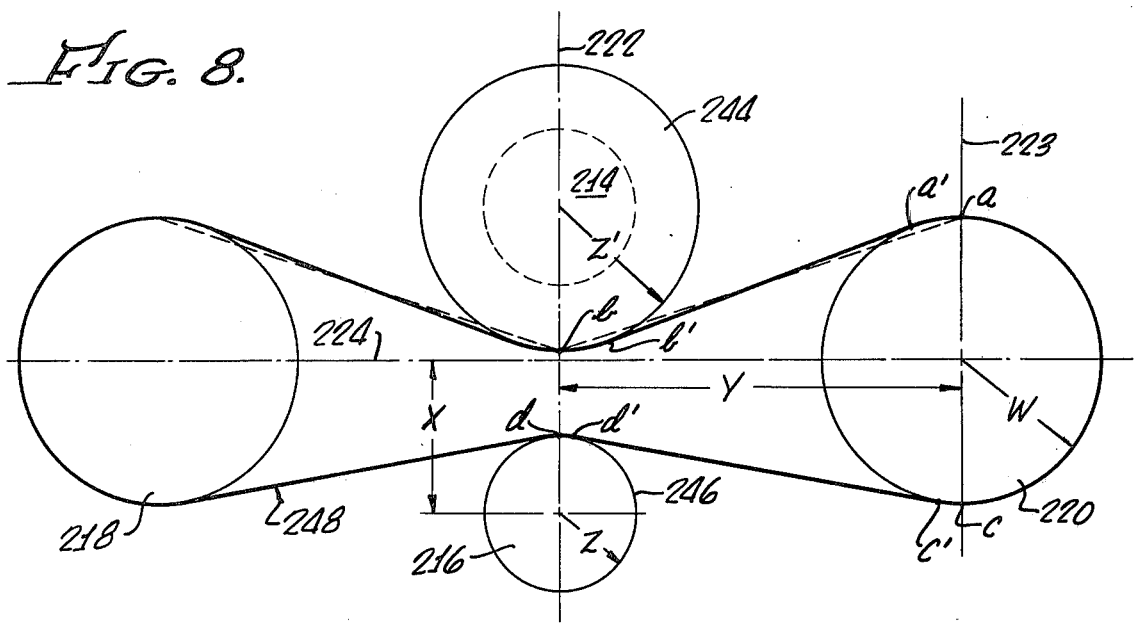
FIG. 8 is a schematic representation of the tape transport system of FIG. 7.
FIG. 9 is a schematic representation of a tape transport system similar to FIG. 8, but with the geometric positions of the tape hubs and belt guide members modified.

FIGS. 8 and 9 are schematic representations of symetrical arrangements of hubs and idlers similar to the configuration shown in FIGS. 6 and 7. The geometry of FIGS. 8 and 9 has been exaggerated for east of understanding. The purpose of FIGS. 8 and 9 is to demonstrate a means by which the belt path length can be maintained essentially constant without the use of a compliant idler or the like. In the past the latter has been required in order to allow for the fact that the effect of reducing the radius of the supply pack on shortening of the belt path is not complemented by the corresponding effect of increasing radius of the takeup reel on lengthening of the belt path except at the point where both packs 244 and 246 are equal in radius, during which unique event the shortening and lengthening effects momentarily become complementary.

Referring now to FIGS. 8 and 9, points a, b, c and d represent points on the peripheries of the idler 220 and the tape packs 244, 246 (all reference numerals corresponding to those in FIG. 6), and are spaced on said peripheries at the intersection points between periphery and the vertical lines 222, 223 going through the centers of the respective circles. Similarly points a', b', c' and d' represent the locations of the points of tangency between the drive belt 248 and the respective peripheries.

By inspection it will be seen that the lengths of the belt spans between points a–b and c–d will very nearly approximate the straight lines joining a–b and c–d respectively, and, when tape is fed from supply hub 214 with tape pack radius z' to an empty take-up hub 216 with radius z, that since z will increase faster than z', then the length c–d will increase faster than a–b will decrease, with a consequent lengthening of the belt path until the point when the two tape packs 244 and 246 are equal in radii.

Thus, if the length of the belt path is L and a change in its length with the transfer of tape is $\Delta L$, then $\Delta L/L$ will be positive for the first half, zero at the midpoint, and negative during the second half of tape transfer.

I have discovered a phenomenon however which can be made to generate an effect on $\Delta L$ during tape transfer which is in the opposite direction to that described above, and as a result can be made to very nearly complement it and thereby cancel the effects of changing tape pack radii due to tape transfer.

Consider FIG. 9, a schematic representation of the same drives as FIG. 8, except that the geometry has been modified to provide increased wrap angles between the drive belt and tape packs. Again by inspection, it will be seen that while the length of the drive belt span between points c–d will still nearly approximate the straight line adjoining c–d, this approximation will not at all hold for the belt span following path a-a'-b'-b, since that "ogee" shaped span is much longer than the straight line a-b. (It is important to note that as a' approaches a and b' approaches b, the span length approaches a straight line.) Thus, as tape is fed from a large supply pack 244 to a small take-up pack 246, the small negative $\Delta L$ effect from the small supply radius change (as compared to the large change in take-up radius) is supplemented by an additional negative $\Delta L$ effect as a' rapidly approaches a and b' approaches b, whereas on the small take-up pack, c' and c are already nearly together, as are d' and d, so the supplemental effect on the positive $\Delta L$ of the take-up side is negligible.

The ratio of change in length to length of the drive belt $|\Delta L|/L$ for a given set of hubs and guide members, or idlers, is dependent in a critical manner on their precise relative placement as hereinabove discussed.

Whether a particular drive belt will be usable in a given geometric configuration is dependent upon both the belt material and allowable change in belt tension. For example, the change in belt tension may be less than 1%, as is the case for the preferred embodiment, which is a desirable design criteria for cartridge use.

The following discussion shows the relationship between the ratio of in belt length $\Delta L/L$ and the change in belt tension to initial tension $\Delta S/S$.

Beginning, if S equals the initial tension of the material selected, and E equals Young's Modulus of Elasticity then, $$\frac{\Delta L}{L} = \frac{\Delta S}{E}$$

Next, if the actual design stress is S' and r is the allowable tensile strength/stress ratio, that is, $$S' = \frac{S}{r}$$

so that, $$\Delta S' = \frac{\Delta S}{r}$$

then $$\Delta S' = \frac{E \Delta L}{L}$$

$$\frac{\Delta S}{r} = \frac{E \Delta L}{L}$$

and $$\frac{\Delta S}{S} = \frac{r E \Delta L}{S L}$$

Hence if a Mylar belt is to be used, for example, the material properties, are a Young's Modulus of $E = 7.5 \cdot 10^5$ psi and a tensile strength of $S = 2.3 \times 10^4$ psi.

If the tensile strength/stress ratio r is equal to approximately 5, typical in the design of drive belts, then $$\frac{\Delta S}{S} = 163 \frac{\Delta L}{L}$$

and if it is desired to limit ratio $\Delta S/S$ to 1% as hereinabove stated then, $$\frac{\Delta L}{L} = \frac{.01}{163} = 60 \times 10^{-6}$$

or $|\Delta L|/L$ equals 60 parts per million.

Thus, if a Mylar drive belt is used in a peripheral belt drive transport in which it is desired to hold the variation of tension in the drive belt to 1%, the diameter of the hubs, idlers and maximum tape pack must be selected along with the relative positions thereof such that the ratio $|\Delta L|/L$ does not exceed 60 RPM. The converse is, of course, also truem that is if the selected configuration of hubs and idlers gives a $|\Delta L|/L$ of more than 60 RPM a Mylar belt could not be used if the desired tension variations is to be less than 1%.

It should be appreciated that if a 2% tension variation is allowable then $|\Delta L|/L$ can be as large as 120 PPM, and so forth.

Figure 10:
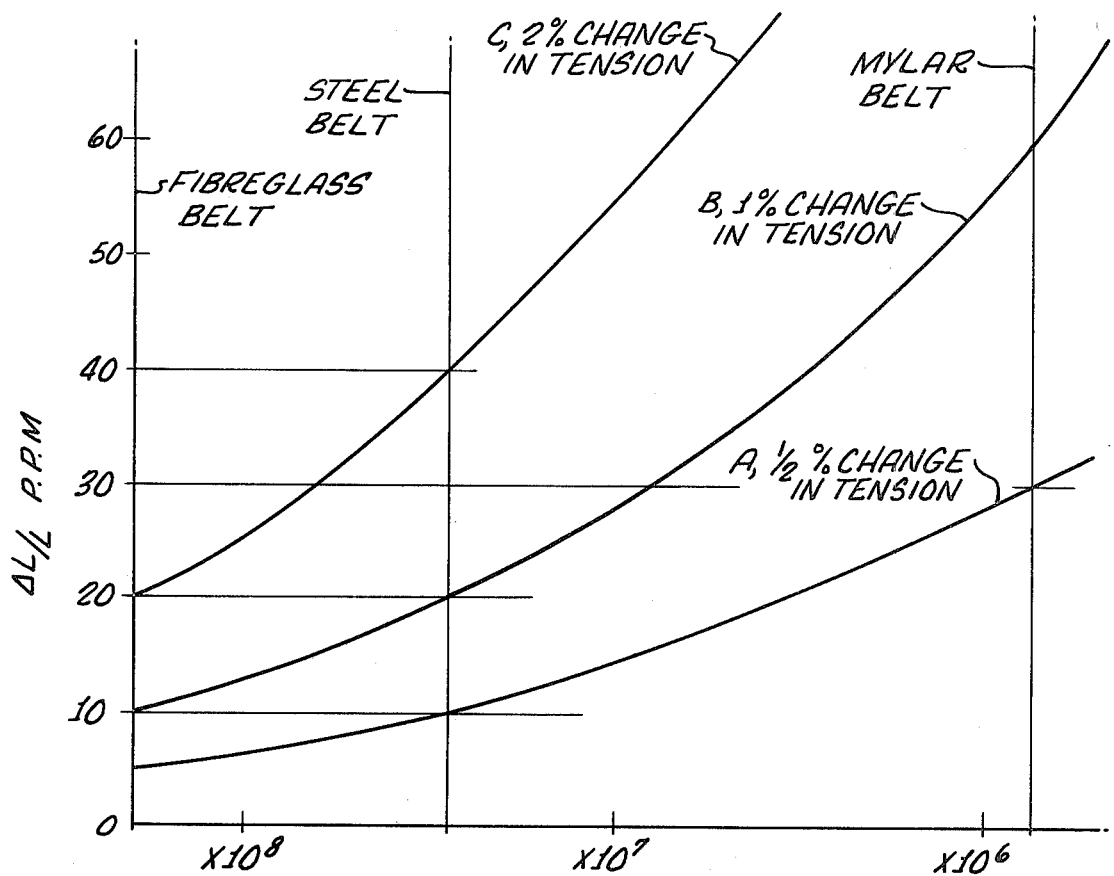
FIG. 10 is a graph representing the relationship between the relative change in drive belt length, Youngs Modulus and percent change in tension in the drive belt.

The results of similar calculation for other belt materials such as steel with a Young's Modulus of elasticity of $2.8 \times 10^7$ psi, and fiberglass with a Young's Modulus of elasticity of $2 \times 10^8$ are shown in FIG. 10 for preselected values of ($\Delta L/L$) of 1/2%, 1% and 2%.

This curve is representative of but not limited to these particular stiff belt materials which can be employed in peripheral belt drive transports according to this invention.

It should be noted here also that the relative stiffness of drive belt and tape is not determined solely by the Young's Modulus of elasticity of the belt and tape materials, but is dependent in addition on the cross-sectional area of the belt and tape and better described by the coefficient of elongation which is equal to L/AE, when L is the length of the span in question, A is the cross-section of the belt or tape and E is the Young's Modulus of the belt or tape. Thus, for example if, for a particular belt and tape span in question, the belt has a cross-section which is greater than the tape, and they are both for example Mylar, so they have identical coefficients of elongation, the belt Young's Modulii, L/AE, will be smaller than that of the tape and hence be stiffer.

It should also be appreciated that the relative lengths of belt and a tape between two hubs may contribute to the overall stretchability of the belt and tape lengths extending therebetween. However, unless there is a substantial difference between the belt length and tape length between the two hubs this effect can be essentially ignored (for simplicity) when defining relative stiffness of the belt and the tape.

CALCULATION OF DRIVE BELT LENGTH CHANGE

As hereinbefore described, the drive belt length is dependent on a number of variables which include the precise relative placement of the idlers and hubs, and radii of the hubs and idlers, and the amount of tape wrapped upon the hubs. In addition, these variables combine to determine the wrap angle, or amount of engagement, the drive belt has with the periphery of the tape packs wound on each hub which in turn in part defines the path of the drive belt as it is trained about the hubs and idlers.

Figure 11:
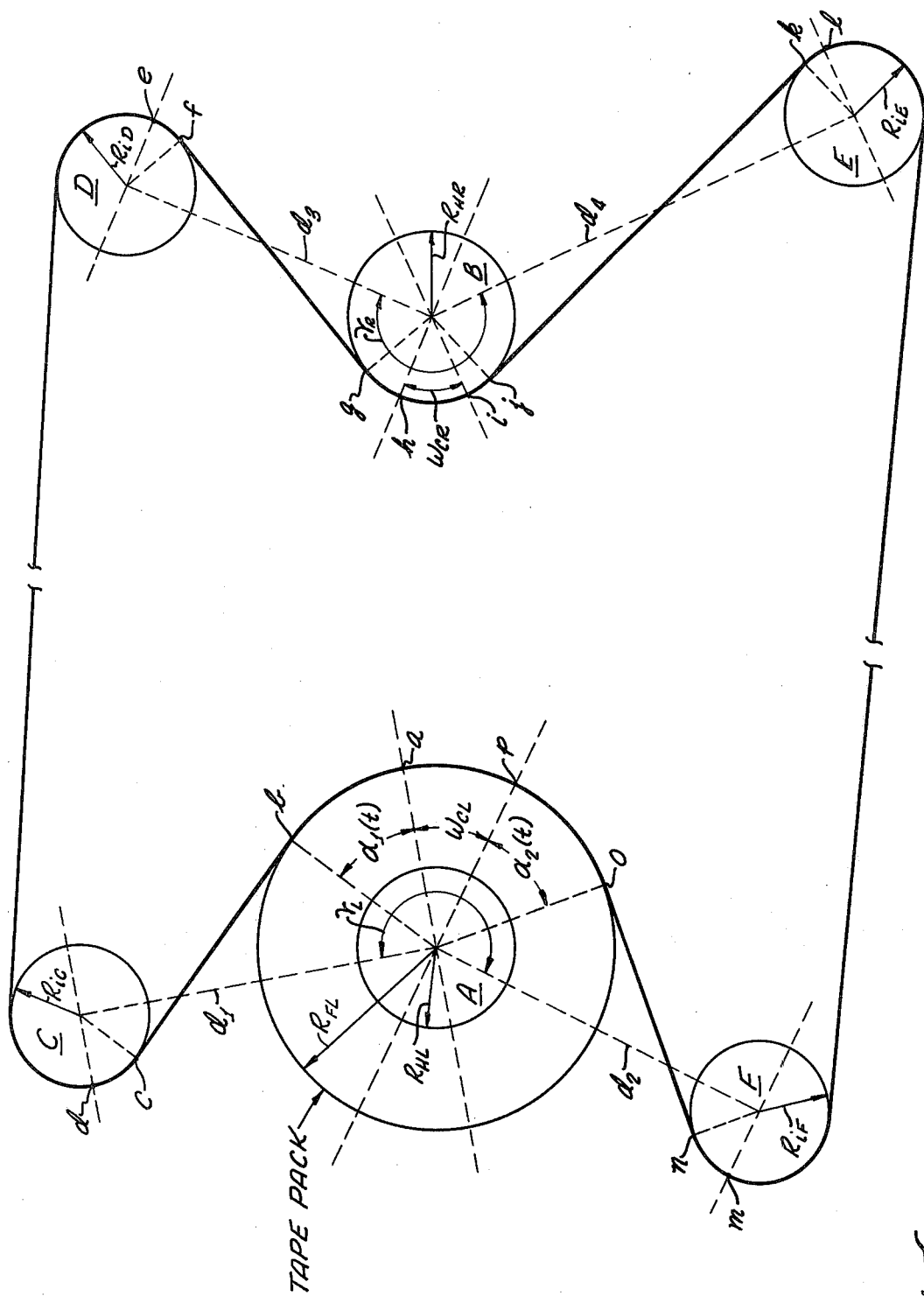
FIG. 11 is a schematic diagram of a generalized tape transport system, which encompasses principles of both FIGS. 1 and 7.

In calculation of the drive belt length for a generalized tape transport system consider now FIG. 11 which diagrams a left hub A with a full tape pack, and a right hub B with an empty tape pack, which have a radius $R_{HL}$ and $R_{HR}$ respectively, and a set of four idlers, C, D, E, F with corresponding radii of $R_{iC}$, $R_{iD}$, $R_{iE}$ and $R_{iF}$. In general, these radii may be unequal, and, the idlers C, F may be spaced unequal distances $d_1$, $d_2$ respectively, from the left hub A and the idlers D, E may be spaced unequal distances $d_3$, $d_4$ respectively, from the right hub B.

It should be noted that the idlers C, F associated with the hub A and the idlers D, E associated with the hub B may not have their centers lying in a straight line but in fact may define an angle $\gamma_L$ and an angle $\gamma_R$ between the lines $d_1$, $d_2$ and $d_3$, $d_4$ respectively which, as shown in FIG. 11, join the centers of the associated hubs and idlers. The effect of this angle will be discussed hereinafter.

It can be seen that for a general case the total length L of a drive belt trained about the hubs A, B and idlers C, D, E, F will be the sum of the lengths from a point (a) to (d) plus (d) to (e) plus (e) to (h), . . . etc., or $$L = L_{ad} + L_{de} + L_{eh} + L_{hi} + L_{il} + L_{lm} + L_{mp} + L_{pa} \quad (1)$$

It should be appreciated that L is a function of time or percent (t) of tape transfer from hub A to hub B (as described below).

Continuing, of those separate lengths it can be seen that the lengths $L_{de}$ and $L_{lm}$ are fixed and do not change as tape is transferred from hub A to hub B thus changing the radius of the tape pack wound thereon. This fixed length $L_F = L_{de} + L_{lm}$ can be measured for any arrangement of hubs and idlers and may be changed by changing the relative position of the hubs A, B and idlers C, D, E, F or by adding additional idlers, but once these positions are fixed, $L_F$ is unvarying as the tape pack radii change from $R_{FL}$ to $R_{HL}$ and $R_{HR}$ to $R_{FR}$, not shown, respectively.

Thus, the total belt length (L) can be described, $$L = L_{ad} + L_{eh} + L_{hi} + L_{il} + L_{mp} + L_{pa} + L_F \quad (2)$$

It should be observed at this point that the distances $L_{ad}$, $L_{eh}$, $L_{il}$ and $L_{mp}$ can be calculated in the same manner and that a general solution for any one of these lengths is applicable to each an every one. That is, they are each calculated in the same manner using the appropriate dimensions associated with the hub and idler they connect.

Figure 12:
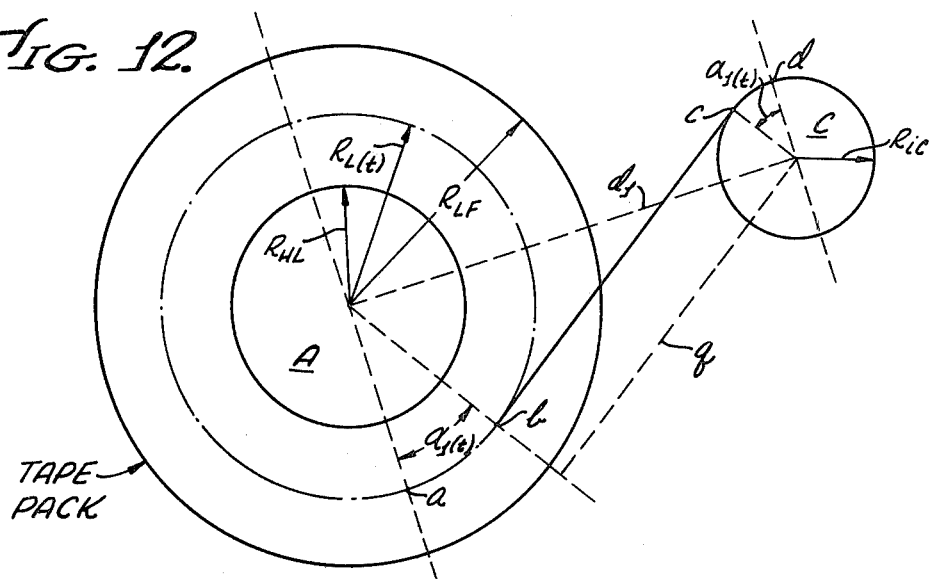
FIG. 12 is a schematic diagram of a changing portion of the drive belt.

Referring now to FIG. 12, the belt length $L_{ad} = L_{ab} + L_{bc} + L_{cd}$ is shown at an intermediate time (t) as the tape pack radius changes from a maximum of $R_{FL}$ to a maximum $R_{HL}$. The radius of the tape pack at any time (t) is equal to $R_L(t)$ as shown by the dashed circle in FIG. 12.

It can be easily seen by the use of a construction line (q) which is equal in length to the distance $L_{bc}$ that $$L_{bc} = \sqrt{d_1^2 - (R_L(t) + R_{ic})^2} \quad (3)$$

Next, it can be shown by geometric construction that the angle subtending the arc length $L_{cd}$ is equal to $\alpha_1(t)$ and that $$\alpha_1(t) = \text{SIN}^{-1}\left(\frac{R_L(t) + R_{ic}}{d_1}\right) \quad (4)$$

hence the arc lengths $L_{cd}$ and $L_{ab}$ are respectively $$L_{cd} = R_{ic}\alpha_1(t) \quad (5)$$

$$L_{ab} = R_L(t)\alpha_1(t) \quad (6)$$

and the length of the belt form (a) to (d) is $$L_{ad} = \sqrt{d_1^2 - (R_L(t) + R_{ic})^2} + (R_{ic} + R_L(t))\alpha_1(t) \quad (7)$$

Similar expression can be developed for the corresponding belt lengths $L_{fg}$, $L_{jk}$ and $L_{no}$.

The arc distance $L_{pa}$ can be seen from FIG. 12 to equal $$L_{pa} = W_{CL} R_L(t) \quad (8)$$

where $W_{CL} = \gamma_L - 180°$. A similar expression exists for $L_{hi}$.

Finally, the radius of the tape pack at any time (t) can be expressed in terms of area ($A_o$) as follows:

First, it can be assumed that the total presented area of the tape packs remains constant as the tape passes from hub A to hub B hence, $$\pi R_{FL}^2 - \pi R_{HL}^2 = \pi R_{FR}^2 - \pi R_{HR}^2 = A_o \quad (9)$$

and so, as the tape transfers $$R_L(t) = \sqrt{R_{FL}^2 - tA_o/\pi} \quad (10)$$

and $$R_R(t) = \sqrt{R_{HR}^2 + tA_0/\pi} \qquad (11)$$

for $0 \leq t \leq 1.0$. The time (t) is expressed in the percent of tape on each hub. That is for $t=0$ all the tape is on hub A and for $t=1$ all the tape is on hub B.

By substitution of equation (7) and similar expressions developed for $L_{fg}$, $L_{jk}$, $L_{no}$ into equation (2) and also substituting equation (8) and a similar expression for $L_{ni}$ into equation (2), the general solution can be found for the overall belt length (L) at any given percent of tape transfer (t).

It should be appreciated that this general expression is a non linear function of (t) and it would not be expected that the variation in the total length (L) would remain substantially constant as the tape transfers from one hub, A, to the other hub B, that is, when (t) varies from 0 to 1.0.

The change in length ($\Delta L$) of the belt length (L) for any given set of variables, $d_1$, $d_2$, $d_3$, $d_4$, and all the radii of the hubs, idlers and maximum tape pack radius is found by calculating the value of (L) for a number of values of (t) between 0 and 1 to find a minimum value, $L_{min}$, and a maximum value, $L_{max}$. These calculations can be performed by hand, however, a computer can be easily programmed to facilitate the calculations.

The change in length ($\Delta L$) is then equal to $$\Delta L = L_{max} - L_{min} \qquad (12)$$

and the ratio of ($\Delta L$) to (L) is $$\frac{\Delta L}{L} = \frac{L_{max} - L_{min}}{L_{min}} \qquad (13)$$

where $L_{min}$ is chosen as the denominator for the purpose of observing the worst case calculation.

To find the minimum $|\Delta L|/L$ for any system, one or more of the variables hereinabove mentioned is varied and a new $|\Delta L|/L$ calculated. These calculations are repeated until the lowest $|\Delta L|/L$ value is found.

It should be noted that the calculation of $|\Delta L|/L$ must be done with precise values of the variables since a change of a few ten thousandths of an inch may result in $|\Delta L|/L$ which is unacceptable for a stiff drive belt transport. As described earlier if a stiff drive belt is used, the $|\Delta L|/L$ must be kept to a very low value, on the order of a few parts per million, or the variation in drive belt tension will be unacceptable, or failure of the drive belt on transport bearings may result.

Figure 13:
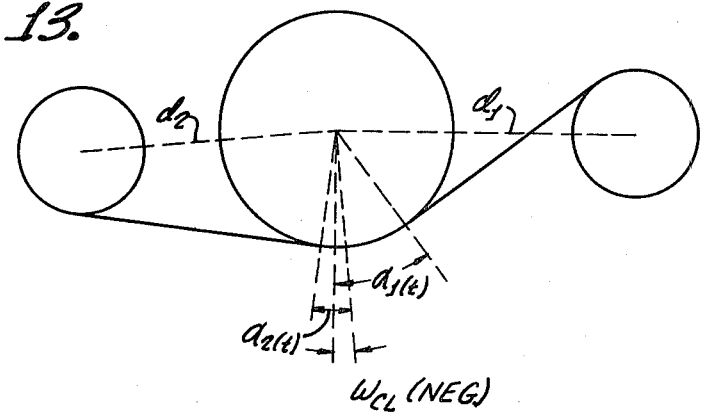
FIG. 13 is a schematic diagram showing the relative effect of rotation idlers (belt guide members) about a tape hub.

It has been found that given values for the hub and idlers radius, a convenient way to alter the geometry of the hubs and idlers to find a minimum $|\Delta L|/L$ is to rotate the idlers about the hubs that is changing $\gamma_L$ and $\gamma_R$, which has the effect of changing the value of $W_{CL}$ and $W_{CR}$, see FIG. 11. The value of $W_{CL}$, for example, may be made positive, as shown in FIG. 11, or negative as shown in FIG. 13.

Figure 14:
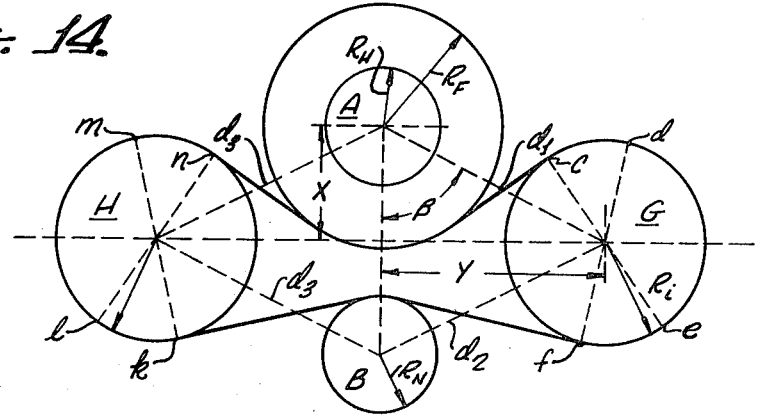
FIG. 14 is a schematic diagram showing the geometric relationship between a specific tape transport system example and the generalized case shown in FIG. 11.
Figure 2:
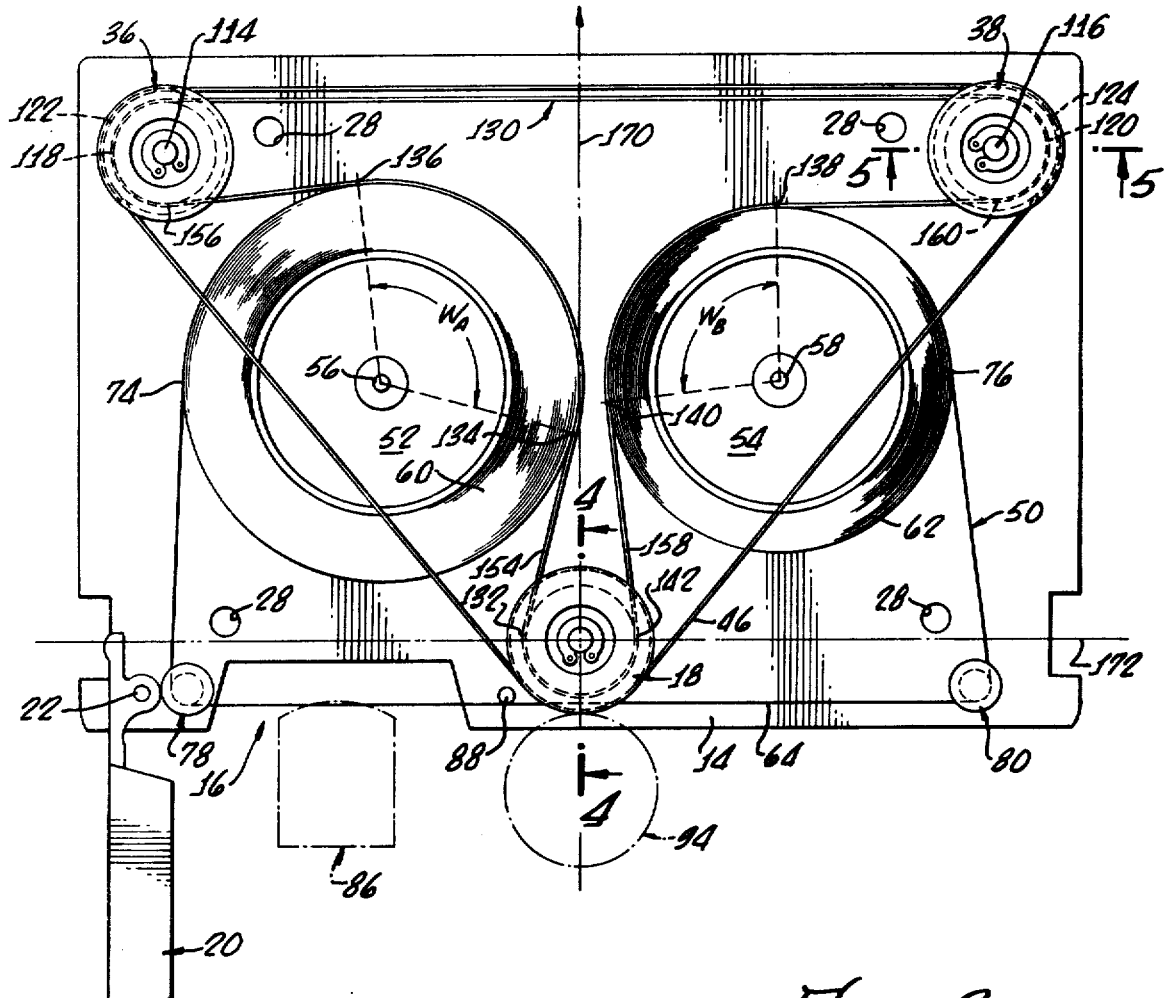
Figure 3:
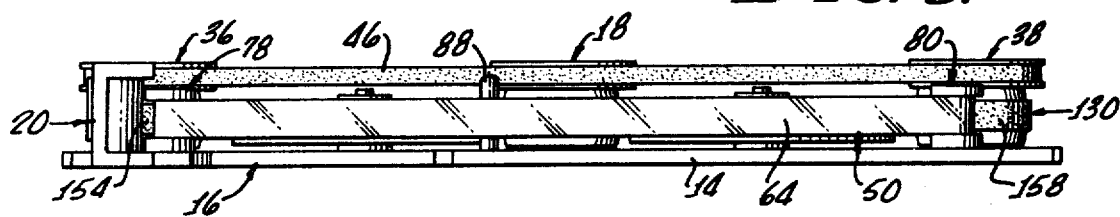
Figure 4:
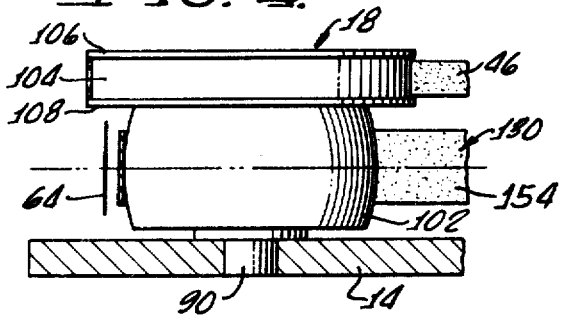
Figure 5:
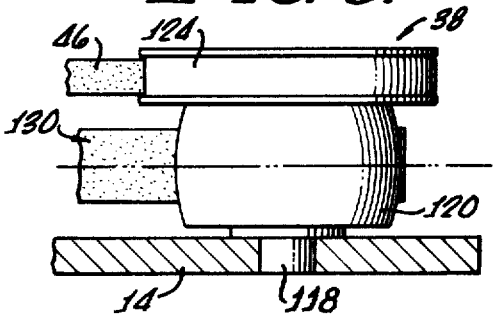
Figure 6:
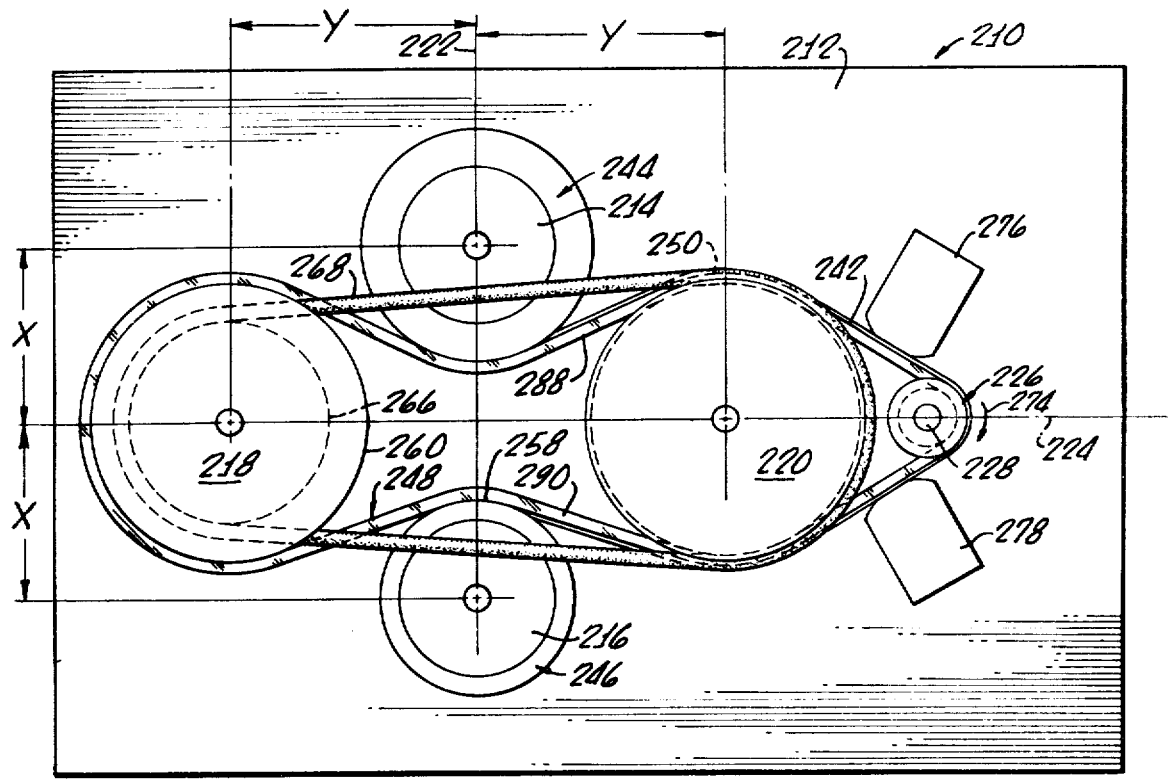
Figure 7:
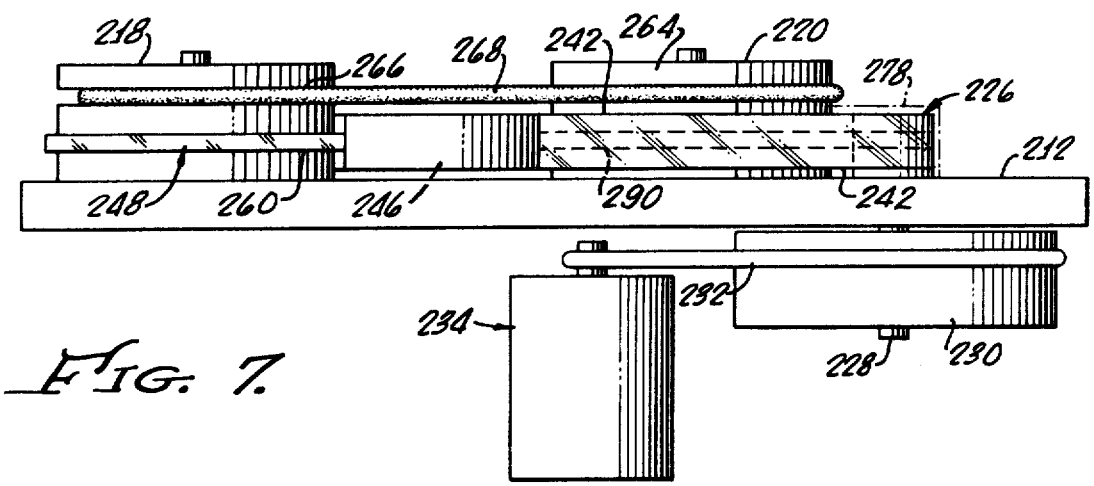
Figure 10:
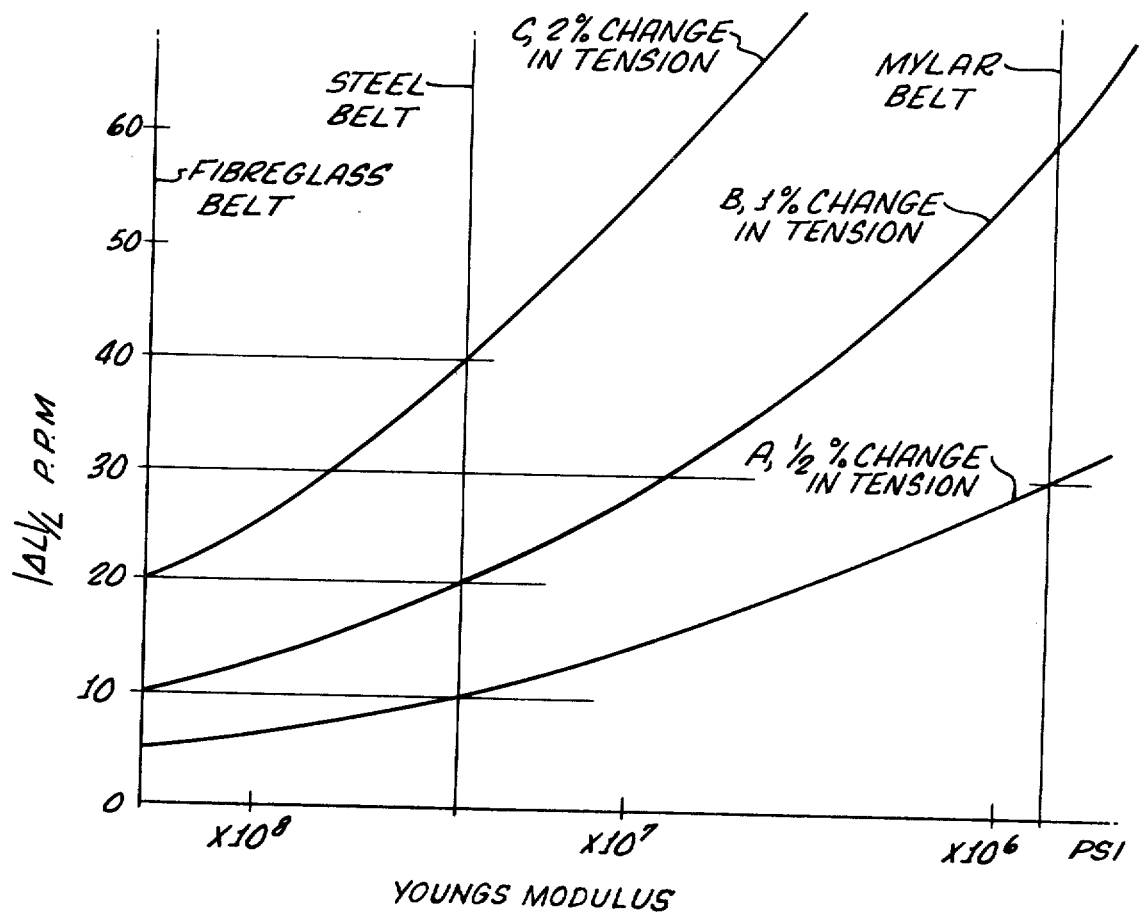

Turning now to calculations for a specific tape transport, for example the two hub, two idler symmetric transport shown in FIG. 14, and applying the general expression for the belt length L derived hereinabove, it can be easily seen that the idlers C, D shown in FIG. 11 become, in this example a single idler G, with the distance $L_{de}$ being equal to $WR_{ig}$ and similarly the idlers E, F become the same idler H with the distance $L_{lm}$ equal to $WR_{ih}$.

In x, y coordinates the distance from a horizontal line joining the center of the two idlers G and H from which each hub A, B is located, is equal to $$x = d_1 \cos\beta$$

where $\beta$ is a measured or calculated angle. Similarly, the distance of the idlers G and H from a vertical line joining the centers of the hubs A, B is $y = d_1 \sin\beta$. Note that $d_1 = d_2 = d_3 = d_4$ in this symmetric example and that $R_{HL} = R_{HR} = R$, $R_{FL} = R_F$ and $R_{ic} = R_{id} = R_{ie} = R_{if} = R_i$.

Using the iterative calculation technique with the expression hereinabove derived for L and modified for this symmetric geometry, each of the variables x, y and idler radius $R_i$ was varied while holding the hub radius $R_H$ and maximum pack radius $R_F$ constant and equal to one and two inches respectively, and solving for a minimum drive belt length change ratio $|\Delta L|/L$. The values of x, y and $R_i$ determined to achieve a minimum $|\Delta L|/L$ are plotted in FIG. 15.

As shown, there is an array of the x, y and $R_i$ variables that can be selected to achieve a minimum drive belt length change $|\Delta L|/L$ as tape is transferred from hub A to hub B. That is for each value of y there is a set of radius of x two values of and $R_i$, shown in the form of a plot in FIG. 15 which a transport may be designed to for achieving minimum drive belt length change, ratio $|\Delta L|/L$. Typical values of $|\Delta L|/L$ will be hereinafter presented for sets of plots exemplified in FIG. 16.

As is evident from FIG. 15, for each value of x, for example 1.60 inches, and selected value of y, for example 4.50 inches, there are two values of idler radius $R_i$ namely, 1.90093 inches and 2.76414 inches, that result in a minimum drive belt length change, ratio $|\Delta L|/L$.

The drive belt length change ratio $|\Delta L|/L$ in parts per million for $x = 1.60$ inches, $y = 4.50$ inches, $R_H = 1$ inch and $R_F = 2$ inches is plotted (FIG. 16) as a function of percent of tape transfer (t) from hub A to hub B for both an idler radius of 1.90093 inches (lower curve) and an idler radius of 2.76414 inches (upper curve). At zero on the abscissa of the plot in FIG. 16 the tape is all on hub A while at 0.5 the tape is half on hub A and half on hub B.

It should be appreciated that the curves represent the minimum $\Delta L/L$ that can be achieved with the values particular of the variables x, y, $R_i$, $R_H$ and $R_F$ stated hereinabove. That is, for example, for any value of y other than 4.50 inches, the plot of $|\Delta L|/L$ or (t) would show a larger value of $|\Delta L|/L$ for the same values of x, $R_i$, $R_H$ and $R_F$.

As shown in FIG. 16 the use of the larger idler, $R_i = 2.76414$ inches ratio, causes a change in belt length $\Delta L/L$ which is always positive, while the use of the smaller idler, $R_i = 1.90093$ inches ratio, causes a change in belt length $\Delta L/L$ which is always negative.

It is evident from the plot of the change in drive belt length in FIG. 16 that the change in drive belt length as the tape passes from one hub A to another hub B can be additionally reduced through the assymetrical use of each idler with different but properly selected diameters. In this case it can be said that each idler diameter can be complimentary sized to effect a reduction in the change of drive belt length ratio $|\Delta L|/L$ drive tape transfer.

RESULTS

This invention may be more fully appreciated when the FIGS. 1 to 5 embodiment thereof is compared to other available cartridges meeting the ANSI proposed standard number X3B5/7518.

The calculated near optimum placement of hubs and idlers along with the selection of hub, idler and tape pack diameter permits, for example, the use of a Mylar drive belt which is approximately 13 times as stiff or the corresponding peripheral drive belt utilized by the conventional cartridge.

This stiff Mylar belt can produce an overall change in tape tension as the tape is transported compared with a tension variation in the conventional cartridge of less than 1/5 as much. In addition, the stiff drive belt combined with the second tensioning belt provides a near energy lossless transport of tape up to velocities approaching 240 inches per second during read and write operations. Further accelerations of up to about 20,000 inches per second squared are accomplished without damage to the tape. This is to be compared with a maximum read and write tape velocity of approximately 30 inches per second and an acceleration capability limited to 1200 inches per second typical of the conventional cartridge.

Such rapid acceleration and velocity performance establishes an inter-record gap of approximately 0.04 inches compared to approximately 0.7 inches for the conventional cartridge, at a writing speed of 30 inches per second at comparable read/write tape velocities.

Finally, the embodiment of FIGS. 1 to 5 can utilize 6 micron Mylar backing recording tape which allows approximately 1000 feet of tape in the same size cartridge as the conventional cartridge which contains approximately 300 feet of 0.001 inch thick Mylar backing tape.

The combination of better tape/head contact and tracking due to improved tape tension stability longer footage of tape and a smaller inter-record gap permits substantially greater effective storage capacity for the preferred embodiment. For example, for an average record length of 4.5 inches with 1600 bits of information per inch, the embodiment of FIGS. 1 to 5 can store up to $19 \times 10^6$ bits of information when operated at 30 inches per second tape velocity. This compares to the conventional cartridge with a corresponding effective storage capacity of about $5 \times 10^6$ bits, or 3 to 4 times less.

The allowance of higher bit packing and track densities for comparable data reliability even further increases, for example over 50:1 the potential storage capacity of our cartridge as compared to the conventional cartridge.

I claim:

1. A tape transport system comprising:
   a tape supply hub and a tape take-up hub;
   a length of tape having one end portion wound about the supply hub, an opposite end portion wound about the tape take-up hub, and an intermediate portion extending between the hubs;
   an endless drive belt loop having a stiffness which is approximately equal to or greater than that of the tape for peripherally driving the tape wound hubs to transfer tape from one to the other and for establishing a tension in the tape;
   non-compliant guide means for supporting the drive belt in driving relationship with the tape wound hubs, said non-compliant guide means including a plurality of rotary belt guide members;
   the drive belt loop engaging the peripheries of the belt guide members and extending proximate to the tape wound hubs, with the drive belt loop having a first portion extending in a curved path between the peripheries of a pair of the guide members and intermediately engaging the periphery of the tape wound on the supply hub and a second portion extending in a curved path between the peripheries of a pair of the guide members and intermediately engaging the periphery of the tape wound on the take-up hub;
   means for establishing a differential in tension between the first and second portions of the drive belt to produce a tension in the tape; and,
   means for substantially reducing the net tension variation in the first and second drive belt portions resulting from change in the curved paths due to tape transfer between the hubs, said tension variation reducing means comprising means mounting the hubs and guide members at spaced fixed locations mathematically calculated to produce approximately equal and opposite path length change effects for the first and second portions of the drive belt as the tape length transfers between the hubs.

2. The apparatus of claim 1, wherein the drive belt has a width which is approximately equal to the width of the tape.

3. The apparatus of claim 1, wherein the stiffness of the drive belt substantially exceeds the comparable stiffness of the tape.

4. The apparatus of claim 1, wherein the drive belt is sufficiently stiff compared to the tape that the drive belt carries the majority of the tension in the combined tape and belt coupling between the hubs.

5. A tape transport system, comprising:
   a tape supply hub and a tape take-up hub;
   a length of tape having one end portion wound on the supply hub, an opposite end portion wound on the take-up hub, and an intermediate portion extending between the hubs;
   an endless loop drive belt having a predetermined length (L) and stiffness which is at least approximately equal to that of the tape for peripherally driving the tape wound hubs to transfer tape from one to the other;
   non-compliant guide means for supporting the drive belt in driving relationship with the tape wound hubs, said non-compliant guide means including a plurality of belt guide members;
   said endless loop drive belt engaging the peripheries of said belt guide members and extending proximate said tape hubs, with the belt loop having a first portion extending in a curved path between the peripheries of a pair of said guide members and intermediately engaging the periphery of the tape wound on the supply hub and a second portion extending in a curved path between the peripheries of a pair of said guide members and intermediately engaging the periphery of the tape wound on the take-up hub;
   means for establishing a differential in tension between the first and second portions of the drive belt to produce a tension in the tape; and,
   means for substantially reducing the net tension variation in said first and second drive belt portions resulting from change in said curved paths due to tape transfer between the hubs, said net tension variation reducing means comprising means mounting the hubs and guide members at spaced fixed locations for producing approximately equal and opposite path length change effects for said first and second portions of the drive belt as said tape length transfers between the hubs, with the ratio of the absolute value of the net change in belt path length (ΔL) to the belt length (L) being held to less than 0.001.

6. A tape transport system, comprising:

a tape supply hub and a tape take-up hub;

a length of tape having one end portion wound on the supply hub, an opposite end portion would on the take-up hub, and an intermediate portion extending between the hubs;

an endless loop drive belt having a stiffness which is at least approximately equal to that of the tape for peripherally driving the tape wound hubs to transfer tape from one to the other;

non-compliant guide means for supporting the drive belt in driving relationship with the tape wound hubs, said non-compliant guide means including at least two rotary guide members;

said endless loop drive belt engaging the peripheries of said two guide members at a first level and extending proximate said tape hubs, with the drive belt loop having a first portion extending in a curved path between the peripheries of said two guide members and intermediately engaging the periphery of the tape wound on the supply hub and a second portion extending in a curved path between the peripheries of said two guide members and intermediately engaging the periphery of the tape wound on the take-up hub;

tensioning means for establishing a differential in tension between the first and second portions of the drive belt to produce a tension in tape, said tensioning means comprising an endless tensioning belt engaging the periphery of at least one of said two guide members at a second level; and, means for substantially reducing the net tension variation in said first and second drive belt portions resulting from change in said curved paths due to tape transfer between the hubs, said net tension variation reducing means comprising means mounting the hubs and guide members at spaced fixed locations for producing approximately equal and opposite path length change effects for said first and second portions of the drive belt as said tape length transfers between the hubs.

7. A tape transport system, comprising:

a tape supply hub and a tape take-up hub;

a length of tape having one end portion wound on the supply hub, an opposite end portion wound on the take-up hub, and an intermediate portion extending between the hubs;

an endless loop drive belt having a stiffness which is at least approximately equal to that of the tape for peripherally driving the tape wound hubs to transfer tape from one to the other;

non-compliant guide means for supporting the drive belt in driving relationship with the tape wound hubs, said non-compliant guide means including at least two rotary guide members each having corresponding portions at first and second levels with the corresponding diameters of the guide members at the first level affording a different mechanical advantage than the corresponding diameters of the guide members at the second level;

said endless loop drive belt engaging the peripheries of said two guide members at the first level and extending proximate said tape hubs, with the drive belt loop having a first portion extending in a curved path between the peripheries of said two guide members and intermediately engaging the periphery of the tape wound on the supply hub and a second portion extending in a curved path between the peripheries of said two guide members and intermediately engaging the periphery of the tape wound on the take-up hub;

tensioning means for establishing a differential in tension between the first and second portions of the drive belt to produce a tension in the tape, said tensioning means comprising an endless loop tensioning belt engaging the peripheries of said two guide members at the second level; and, means for substantially reducing the net tension variation in said first and second drive belt portions resulting from change in said curved paths due to tape transfer between the hubs, said net tension variation reducing means comprising means mounting the hubs and guide members on spaced fixed locations for producing approximately equal and opposite path length change effects for said first and second portions of the drive belt as said tape length transfers between the hubs.

8. A tape transport system, comprising:

a tape supply hub and a tape take-up hub;

a length of tape having one end portion wound on the supply hub, an opposite end portion wound on the take-up hub, and an intermediate portion extending between the hubs;

an endless loop drive belt having a predetermined length (L) and stiffness which is at least approximately equal to that of the tape for peripherally driving the tape wound hubs to transfer tape from one to the other;

said drive belt having a width which is approximately equal to the width of the tape;

non-compliant guide means for supporting the drive belt in driving relationship with the tape wound hubs, said non-compliant guide means including a plurality of belt guide members;

said endless loop drive belt engaging the peripheries of said belt guide members and extending proximate said tape hubs, with the belt loop having a first portion extending in a curved path between the peripheries of a pair of said guide members and intermediately engaging the periphery of the tape wound on the supply hub and a second portion extending in a curved path between the peripheries of a pair of said guide members and intermediately engaging the periphery of the tape wound on the take-up hub;

means for establishing a differential in tension between the first and second portions of the drive belt to produce a tension in the tape; and, means for substantially reducing the net tension variation in said first and second drive belt portions resulting from change in said curved paths due to tape transfer between the hubs, said net tension variation reducing means comprising means mounting the hubs and guide members at spaced fixed locations for producing approximately equal and opposite path length change effects for said first and second portions of the drive belt as said tape length transfers between the hubs, with the ratio of the absolute value of the net change in belt path length (ΔL) to the belt length (L) being held to less than 0.001.

9. A tape transport system, comprising:
a tape supply hub and a tape take-up hub;
a length of tape having one end portion wound on the supply hub, an opposite end portion wound on the take-up hub, and an intermediate portion extending between the hubs;
an endless loop drive belt having a predetermined length (L) and stiffness which substantially exceeds that of the tape of peripherally driving the tape wound hubs to transfer tape from one to the other;
non-compliant guide means for supporting the drive belt in driving relationship with the tape wound hubs, said non-compliant guide means including a plurality of belt guide members;
said endless loop drive belt engaging the peripheries of said belt guide members and extending proximate said tape hubs, with the belt loop having a first portion extending in a curved path between the peripheries of a pair of said guide members and intermediately engaging the periphery of the tape wound on the supply hub and a second portion extending in a curved path between the peripheries of a pair of said guide members and intermediately engaging the periphery of the tape wound on the take-up hub;
means for establishing a differential in tension between the first and second portions of the drive belt to produce a tension in the tape; and,
means for substantially reducing the net tension variation in said first and second drive belt portions resulting from change in said curved paths due to tape transfer between the hubs, said net tension variation reducing means comprising means mounting the hubs and guide members at spaced fixed locations for producing approximately equal and opposite path length change effects for said first and second portions of the drive belt as said tape length transfers between the hubs, with the ratio of the absolute value of the net change in belt path length ($\Delta L$) to the belt length (1.) being held to less than 0.001.

10. A tape transport system, comprising:
a tape supply hub and a tape take-up hub;
a length of tape having one end portion wound on the supply hub, an opposite end portion wound on the take-up hub, and intermediate portion extending between the hubs;
an endless loop drive belt having a predetermined length (L) for peripherally driving the tape wound hubs to transfer tape from one to the other, the drive belt being sufficiently stiff compared to the tape that the drive belt carries the majority of the tension in the combined tape and belt coupling between the hubs;
non-compliant guide means for supporting the drive belt in driving relationship with the tape wound hubs, said non-compliant guide means including a plurality of belt guide members;
said endless loop drive belt engaging the peripheries of said belt guide members and extending proximate said tape hubs, with the belt loop having a first portion extending in a curved path between the peripheries of a pair of said guide members and intermediately engaging the periphery of the tape wound on the supply hub and a second portion extending in a curved path between the peripheries of a pair of said guide members and intermediately engaging the periphery of the tape wound on the take-up hub;
means for establishing a differential in tension between the first and second portions of the drive belt to produce a tension in the tape; and,
means for substantially reducing the net tension variation in said first and second drive belt portions resulting from change in said curved paths due to tape transfer between the hubs, said net tension variation reducing means comprising means mounting the hubs and guide members at spaced fixed locations for producing approximately equal and opposite path length change effects for said first and second portions of the drive belt as said tape length transfers between the hubs, with the ratio of the absolute value of the net change in belt path length ($\Delta L$) to the belt length (L) being held to less than 0.001.

11. A tape transport system comprising:
a tape supply hub and a tape take-up hub;
a length of tape having one end portion wound about the supply hub, an opposite end portion wound about the tape take-up hub, and an intermediate portion extending between the hubs;
an endless drive belt loop having a stiffness which is approximately equal to or greater than that of the tape for peripherally driving the tape wound hubs to transfer tape from one to the other and for establishing a tension in the tape;
non-compliant guide means for supporting the drive belt in driving relationship with the tape wound hubs, said non-compliant guide means including a plurality of rotary belt guide members, at least one of the guide members being assymetrically positioned relative to the other guide members;
the drive belt loop engaging the peripheries of the belt guide members and extending proximate to the tape wound hubs, with the drive belt loop having a first portion extending in a curved path between the peripheries of a pair of the guide members and intermediately engaging the periphery of the tape wound on the supply hub and a second portion extending in a curved path between the peripheries of a pair of the guide members and intermediately engaging the periphery of the tape wound on the take-up hub;
means for establishing a differential in tension between the first and second portions of the drive belt to produce a tension in the tape; and,
means for substantially reducing the net tension variation in the first and second drive belt portions resulting from change in the curved paths due to tape transfer between the hubs, said tension variation reducing means comprising means mounting the hubs and guide members at spaced fixed locations mathematically calculated to produce approximately equal and opposite path length change effects for the first and second portions of the drive belt as the tape length transfers between the hubs.

12. A tape transport system comprising:
a tape supply hub and a tape take-up hub;
a length of tape having one end portion wound about the supply hub, an opposite end portion wound about the tape take-up hub, and an intermediate portion extending between the hubs, said tape having an overall thickness of about 0.0005 inches;
an endless drive belt loop having a stiffness which is approximately equal to or greater than that of the tape for peripherally driving the tape wound hubs to transfer tape from one to the other and for establishing a tension in the tape;

said drive belt enabling tape accelerations up to about 20,000 in/sec$^2$-without compromising tape life;

non-compliant guide means for supporting the drive belt in driving relationship with the tape wound hubs, said non-compliant guide means including a plurality of rotary belt guide members;

the drive belt loop engaging the peripheries of the belt guide members and extending proximate to the tape wound hubs, with the drive belt loop having a first portion extending in a curved path between the peripheries of a pair of the guide members and intermediately engaging the periphery of the tape wound on the supply hub and a second portion extending in a curved path between the peripheries of a pair of the guide members and intermediately engaging the periphery of the tape wound on the take-up hub;

means for establishing a differential in tension between the first and second portions of the drive belt to produce a tension in the tape; and, means for substantially reducing the net tension variation in the first and second drive belt portions resulting from change in the curved paths due to tape transfer between the hubs, said tension variation reducing means comprising means mounting the hubs and guide members at spaced fixed locations mathematically calculated to produce approximately equal and opposite path length change effects for the first and second portions of the drive belt as the tape length transfers between the hubs.

13. A tape transport system, comprising:

a tape supply hub and a tape take-up hub;

a length of tape having one end portion wound on the supply hub, an opposite end portion wound on the take-up hub, and an intermediate portion extending between the hubs;

an endless loop drive belt having a predetermined length (L) and stiffness which is at least approximately equal to that of the tape for peripherally driving the tape wound hubs to transfer tape from one to the other;

non-compliant guide means for supporting the drive belt in driving relationship with the tape wound hubs, said non-compliant guide means including a plurality of belt guide members;

said endless loop drive belt engaging the peripheries of said belt guide members and extending proximate said tape hubs, with the belt loop having a first portion extending in a curved path between the peripheries of a pair of said guide members and intermediately engaging the periphery of the tape wound on the supply hub and a second portion extending in a curved path between the peripheries of a pair of said guide members and intermediately engaging the periphery of the tape wound on the take-up hub;

means for establishing a differential in tension between the first and second portions of the drive belt to produce a tension in the tape;

said tensioning means being virtually lossless, whereby the required belt driving force is less than the resulting net tape tension; and means for substantially reducing the net tension variation in said first and second drive belt portions resulting from change in said curved paths due to tape transfer between the hubs, said net tension variation reducing means comprising means mounting the hubs and guide members at spaced fixed locations for producing approximately equal and opposite path length change effects for said first and second portions of the drive belt as said tape length transfers between the hubs, with the ratio of the absolute value of the net change in belt path length ($\Delta L$) to the belt length (L) being held to less than 0.001.

14. The tape transport system according to claim 13 wherein the tensioning means include an endless tensioning belt, said tensioning belt being entrained over at least one of the drive belt guide members.

15. A cartridge-type tape transport system, comprising:

a tape cartridge;

a tape supply hub and a tape take-up hub mounted in the cartridge;

a length of tape having one end portion wound on the supply hub, an opposite end portion wound on the take-up hub, and an intermediate portion extending between the hubs;

an endless loop drive belt having a stiffness which is at least approximately equal to that of the tape for peripherally driving the tape wound hubs to transfer tape from one to the other;

non-compliant guide means mounting in the cartridge for supporting the drive belt in driving relationship with the tape wound hubs, said noncompliant guide means including at least two rotary guide members each having corresponding portions at first and second levels with the corresponding diameters of the guide members at the first level affording a different mechanical advantage than the corresponding diameters of the guide members at the second level;

only one of said guide members being drivingly accessible through the cartridge, whereby the drive belt, and hence the tape, are adaptable for being driven bidirectionaly by said externally accessible guide member by an external drive;

said endless loop drive belt engaging the peripheries of said two guide members at the first level and extending proximate said tape hubs, with the drive belt loop having a first portion extending in a curved path between the peripheries of said two guide members and intermediately engaging the periphery of the tape wound on the supply hub and a second portion extending in a curved path between the peripheries of said two guide members and intermediately engaging the periphery of the tape wound on the take-up hub;

tensioning means mounted in the cartridge for establishing a differential in tension between the first and second portions of the drive belt to produce a tension in the tape, said tensioning means comprising an endless loop tensioning belt engaging the peripheries of said two guide members at the second level; and, means for substantially reducing the net tension variation in said first and second drive belt portions resulting from change in said curved paths due to tape transfer between the hubs, said net tension variation reducing means comprising means mounting the hubs and guide members on spaced fixed locations in the cartridge for producing approximately equal and opposite path length change effects for said first and second portions of the drive belt as said tape length transfers between the hubs.

16. The cartridge-type tape transport system according to claim 15, wherein at least one other of the guide members is drivingly accessible through the cartridge, whereby the drive belt and hence the tape, are adaptable for being driven by any of the externally accessible guide members by external drives.

* * * * *

UNITED STATES PATENT AND TRADEMARK OFFICE
CERTIFICATE OF CORRECTION

PATENT NO. : 4,172,569
DATED : October 30, 1979
INVENTOR(S) : Chester W. Newell

It is certified that error appears in the above—identified patent and that said Letters Patent is hereby corrected as shown below:

In the Abstract, line 21, after "drive", insert --belt--.
In column 3, line 8, after "L.", insert --(for high performance system)--.
In column 4, line 68, after "wide", delete --.--.
In column 8, line 22, delete "the" and insert --a--.
In column 12, line 30, delete $$L_{bc} = \sqrt{d_1^2 - (R_1(t) + R_{ic})^2}$$

and insert $$L_{bc} = \sqrt{d_1^2 - (R_L(t) + R_{ic})^2}$$

In column 14, line 45, after "the", insert --particular--.
In column 14, line 46, before "of", delete --particular--.
Sheets 2, 3 and 5 of the drawings should be deleted to insert the attached sheets 2, 3 and 5.

Signed and Sealed this

First Day of July 1980

[SEAL]

Attest:

SIDNEY A. DIAMOND

Attesting Officer

Commissioner of Patents and Trademarks